US012517266B2

(12) United States Patent
Rubtsov et al.

(10) Patent No.: US 12,517,266 B2
(45) Date of Patent: Jan. 6, 2026

(54) RELOADABLE CHANNEL IMPLEMENTATION

(71) Applicant: Topcon Positioning Systems, Inc., Livermore, CA (US)

(72) Inventors: Dmitry Anatolyevich Rubtsov, Moscow (RU); Fedor Borisovich Serkin, Moscow (RU); Dmitry Yuryevich Goldberg, Moscow (RU); Leonid Valerianovich Edelman, Saint Petersburg (RU); Sergey Sayarovich Bogoutdinov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 301 days.

(21) Appl. No.: 18/547,719

(22) PCT Filed: Aug. 30, 2022

(86) PCT No.: PCT/RU2022/000262
§ 371 (c)(1),
(2) Date: Aug. 24, 2023

(87) PCT Pub. No.: WO2024/049316
PCT Pub. Date: Mar. 7, 2024

(65) Prior Publication Data
US 2024/0230920 A1    Jul. 11, 2024

(51) Int. Cl.
*G01S 19/37*    (2010.01)
*G01S 19/30*    (2010.01)
(52) U.S. Cl.
CPC .............. *G01S 19/37* (2013.01); *G01S 19/30* (2013.01)

(58) Field of Classification Search
CPC ................................ G01S 19/37; G01S 19/30
USPC ......................................................... 342/352
See application file for complete search history.

(56) References Cited

U.S. PATENT DOCUMENTS

| 7,898,475 B2 | 3/2011 | Nayyar et al. |
| 2006/0251173 A1 | 11/2006 | Wang et al. |
| 2007/0275658 A1 | 11/2007 | Gaal et al. |
| 2008/0273578 A1 | 11/2008 | Brenner et al. |
| 2008/0279260 A1 | 11/2008 | Yeh et al. |
| 2009/0207075 A1 | 8/2009 | Riley et al. |

(Continued)

FOREIGN PATENT DOCUMENTS

| CA | 2701471 A1 | 10/2011 |
| CN | 101303404 A | 11/2008 |

(Continued)

OTHER PUBLICATIONS

International Search Report and Written Opinion mailed Jun. 8, 2023 in connection with International Application No. PCT/RU2022/000262, filed Aug. 30, 2022, 7 pgs.

(Continued)

*Primary Examiner* — Harry K Liu
(74) *Attorney, Agent, or Firm* — Chiesa Shahinian & Giantomasi PC

(57) ABSTRACT

A Global Navigation Satellite System (GNSS) receiver for processing GNSS satellite signals use reloadable channel implementation. The configuration of each channel for processing GNSS signals can be saved and loaded to the same or different channels in order to reduce the time required for channel configuration.

19 Claims, 13 Drawing Sheets

(56) References Cited

U.S. PATENT DOCUMENTS

| | | |
|---|---|---|
| 2009/0213006 A1 | 8/2009 | Nayyar et al. |
| 2009/0224973 A1 | 9/2009 | Nayyar et al. |
| 2010/0208775 A1 | 8/2010 | Weill |
| 2010/0238976 A1 | 9/2010 | Young |
| 2010/0253578 A1 | 10/2010 | Mantovani |
| 2012/0050096 A1 | 3/2012 | Cheng et al. |
| 2013/0120188 A1 | 5/2013 | Pattabiraman et al. |
| 2013/0141277 A1 | 6/2013 | Hang et al. |
| 2014/0184442 A1 | 7/2014 | Large et al. |
| 2019/0219708 A1 | 7/2019 | Rubtsov et al. |
| 2020/0158881 A1 | 5/2020 | Anderson et al. |
| 2021/0132237 A1 | 5/2021 | Molina |

FOREIGN PATENT DOCUMENTS

| | | | | |
|---|---|---|---|---|
| CN | 101978285 A | | 2/2011 | |
| CN | 103149579 A | | 6/2013 | |
| CN | 206057579 U | * | 3/2017 | |
| CN | 111398996 A | | 7/2020 | |
| CN | 112400121 A | | 2/2021 | |
| CN | 113447967 A | | 9/2021 | |
| CN | 114624746 A | * | 6/2022 | G01S 19/30 |
| WO | WO-2006131886 A2 | * | 12/2006 | G01S 19/24 |
| WO | WO-2010019449 A2 | * | 2/2010 | H04B 1/28 |

OTHER PUBLICATIONS

International Search Report and Written Opinion mailed Jun. 8, 2023 in connection with International Application No. PCT/RU2022/000263, filed Aug. 30, 2022, 7 pgs.

International Search Report and Written Opinion mailed May 25, 2023, in connection with International Application No. PCT/RU2022/000264, filed Aug. 30, 2022, 7 pgs.

Notice of Allowance mailed Aug. 12, 2025, in connection with U.S. Appl. No. 18/547,518, filed Aug. 23, 2023, 13 pgs.

First Office Action and Search Report mailed Oct. 1, 2025, in connection with Chinese Patent Application No. 2022800981700, 11 pgs. (including translation).

First Office Action and Search Report mailed Oct. 1, 2025, in connection with Chinese Patent Application No. 2022800987317, 14 pgs. (including translation).

\* cited by examiner

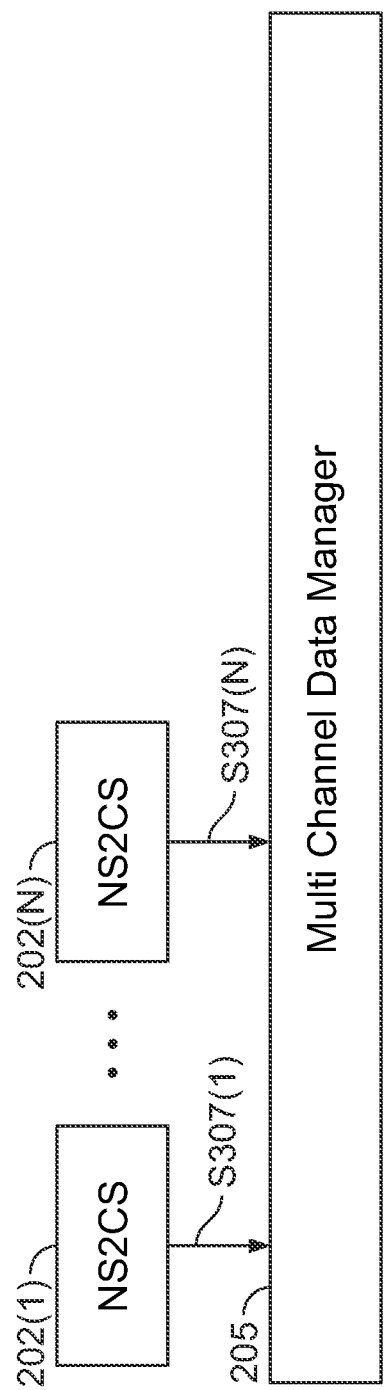

RELOADABLE CHANNEL IMPLEMENTATION

CROSS-REFERENCE TO RELATED APPLICATION(S)

This application is a National Stage under 35 U.S.C. 371 of International Patent Application No. PCT/RU2022/000262, filed Aug. 30, 2022; the disclosure of which is incorporated herein by reference in its entirety.

FIELD OF THE INVENTION

The present disclosure relates generally to receivers, and, more particularly, to receivers for processing satellite navigation signals using a reloadable channel implementation.

BACKGROUND

A Global Navigation Satellite System (GNSS) receiver can obtain a navigation solution (i.e., positioning information) provided that the receiver has reliable signal reception from a number of GNSS satellites to which the receiver is in contact. Reliable signal reception it typically enabled only under certain operating conditions, that is, an open sky environment when there are no obstacles to radio signals propagating from selected navigation satellites to the receiver's antenna. Any antenna blockage by natural or artificial obstacles (e.g., high trees with dense foliage, vertical walls of buildings, bridges, urban canyons, and structural elements of moving vehicles with a mounted GNSS antenna, and so on) will deteriorate the quality of signal reception. As such, the accuracy of these navigation solutions may suffer greatly including a full loss of the ability to accurately provide GNSS positioning in any way. GNSS receivers must also have sufficient processing power to perform required operations in order to determine positioning information in a timely manner.

GNSS receivers typically process GNSS satellite signals to generate location data. Signals are often processed in different channels and the configuration of those channels changes often during processing. What is needed is a receiver that can process GNSS satellite signals in a fast and efficient manner using low-cost components.

SUMMARY

A navigation receiver includes a plurality of RF paths configured to receive Global Navigation Satellite System (GNSS) signals and transmit the GNSS signals. The navigation receiver also includes a navigation system configured to process the GNSS signals based on clock CLKnav. The navigation system comprises a plurality of analog to digital convertors (ADCs) each configured to receive a GNSS signal from a respective one of the plurality of RF paths and generate a digitized signal, a plurality of signal processors configured to process the digitized signals, a plurality of re-quantizers configured to convert the processed digitized signals into low-bit data, a plurality of Navigation system to CPU System (NS2CS) interface blocks configured to generate packages based on the low-bit data, a MUX interconnect configured to distribute data streams, and a time control unit configured to generate a tick signal. The navigation receiver also includes a CPU system operating based on the tick signal and works on clock CLKcpu. The CPU system comprises a memory configured to store data and the packages, a multi-channel data manager configured to convert the packages into data, a plurality of channels configured to receive and process data from the multi-channel data manager, and a DMA channel reload configured to control current states of each of the plurality of channels, the multi-channel data manager further configured to control the DMA channel reload. The navigation receiver also includes a CPU configured to control the navigation system and the CPU system and configured to process data received from the navigation system and the CPU system.

BRIEF DESCRIPTION OF THE DRAWINGS

In the drawings, like numerals describe similar components in different Figures. Like numerals having different letter suffixes represent different instances of similar components and/or signals.

FIG. 5 shows signals received by a multi-channel data manager according to an embodiment;

DETAILED DESCRIPTION

Figure 1:
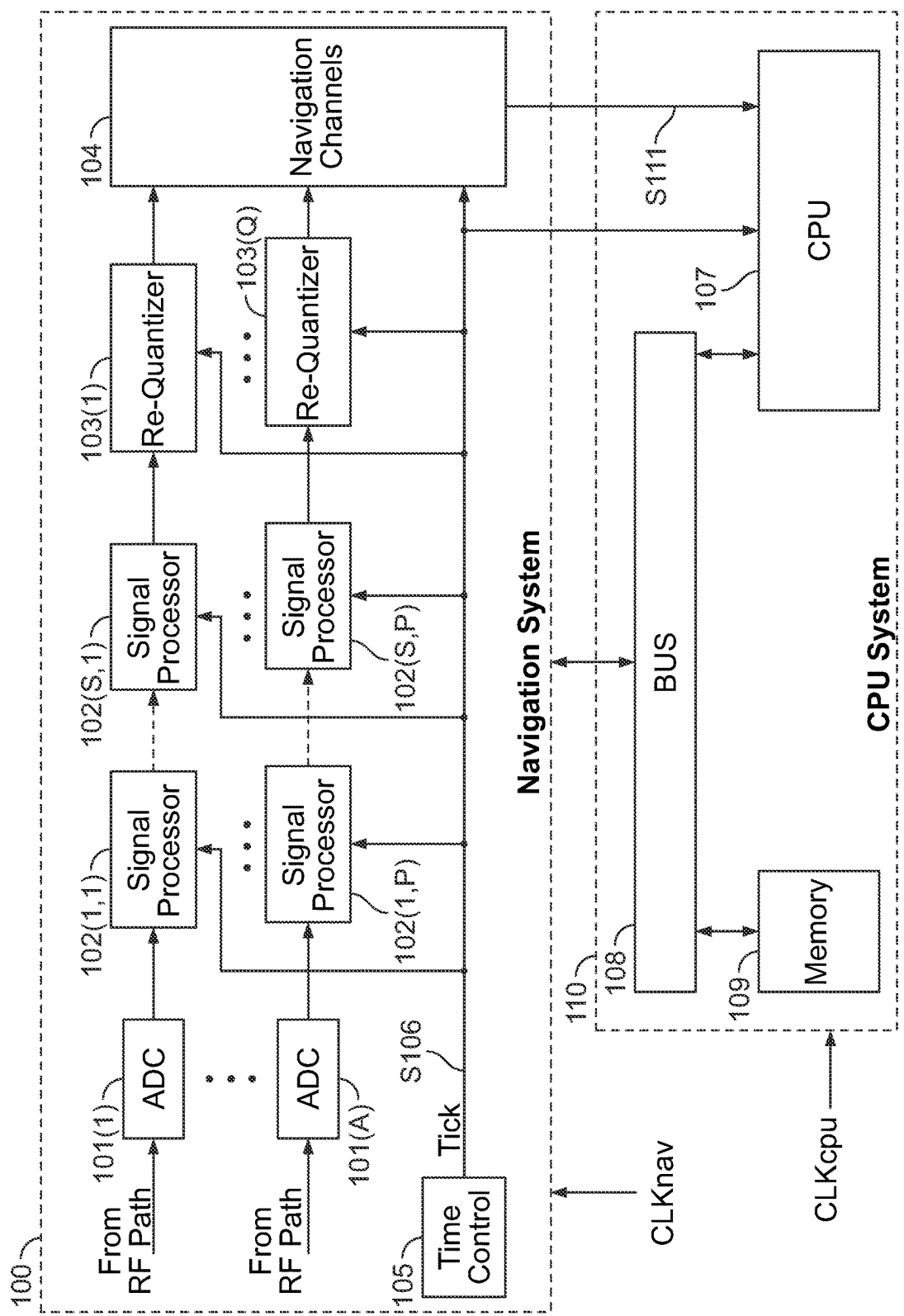
FIG. 1 shows a prior art Global Navigation Satellite System (GNSS) receiver.

FIG. 1 shows a schematic of components of a prior art navigation receiver 1 (e.g., a GNSS receiver) comprising navigation system 100 including "A" number of Analog Digital Converters (ADC) as shown by ADC 101(1) . . . 101(A). ADCs 101(1) . . . 101(A) will be referred to collectively as ADCs 101. Navigation system 100 also comprises a plurality of signal processors forming a plurality of signal paths. A signal path comprising "S" number of signal processors is shown by signal processors 102(1,1) . . . 102(S,1). There are "P" number of signal paths as shown by signal processors 102(1,P) . . . 102(S,P). As such, the first path is shown by signal processors 102(1, 1) . . . 102(S,1) and the last path is shown by signal processors 102(1,P) . . . 102(S,P). The plurality of signal processors including signal processors 102(1,1) . . . 102(1,P) and signal processors 102(S,1) . . . 102(S,P) will be referred to collectively as signal processors 102. Navigation receiver 1 also comprises "Q" number of re-quantizers as shown by re-quantizers 103(1) . . . 103(Q). Re-quantizers 103(1) . . . 103(Q) will be referred to collectively as re-quantizers 103. Navigation receiver 1 shown in FIG. 1 also comprises navigation channels 104, time control 105 transmitting tick signal S106, and CPU system 110 which includes CPU 107, BUS 108, and memory 109, and which receives data readiness flag signal S111.

GNSS signals received by one or more antennas (not shown) are transmitted to one or more of the plurality of RF paths that are connected to the inputs of ADCs 101. The RF paths, in one embodiment, are configured to transmit the GNSS signals in a particular frequency range for digitization. In one embodiment, each of ADCs 101 receives signals from a respective one of a plurality of RF paths. In one embodiment, multiple or all ADCs 101 may receive signals from a single RF path. From the output of ADCs 101 the digitized signal is input to signal processors 102 which process the signal.

It should be noted that one or more components can be used as signal processors 102, for example, signal processors 102 can be filters, noise suppressors, equalizers, and/or decimators, etc.

The signals output from signal processors 102(S,1) . . . 102(S,P) are input to re-quantizers 103(1) . . . 103(Q) which re-quantize the received data into low-bit data. The low-bit data output from re-quantizers 103(1) . . . 103(Q) are input to navigation channels 104 which process the low-bit data.

Navigation channels 104 transmit data ready flag signal S111 to CPU 107. Data ready flag signal S111 indicates that data is ready in navigation channels 104.

Time control 105 generates tick signal S106, which, in one embodiment, is a time scale. The period of tick signal S106 is equal to a number of clocks cycles of CLKnav. Tick signal S106, in one embodiment, is set by CPU 107 before operation of navigation system 100 begins. Tick signal S106 is input to: signal processors 102, re-quantizers 103, navigation channels 104, and CPU 107. A CPU clock is input to CPU 107, BUS 108, and memory 109. Navigation system operates at a rate based on clock CLKnav. Clocks CLKnav and CLKcpu are typically asynchronous, and the CLKcpu rate is generally substantially more than the CLKnav rate.

CPU 107, memory 109, and all components of navigation system 100 are each connected to BUS 108 which allows communication among CPU 107, memory 109, and all components of navigation system 100. When tick signal S106 occurs, CPU 107 receives data via BUS 108 and controls navigation system 100 based on the received data. Memory 109 is used for data storage.

Figure 2:
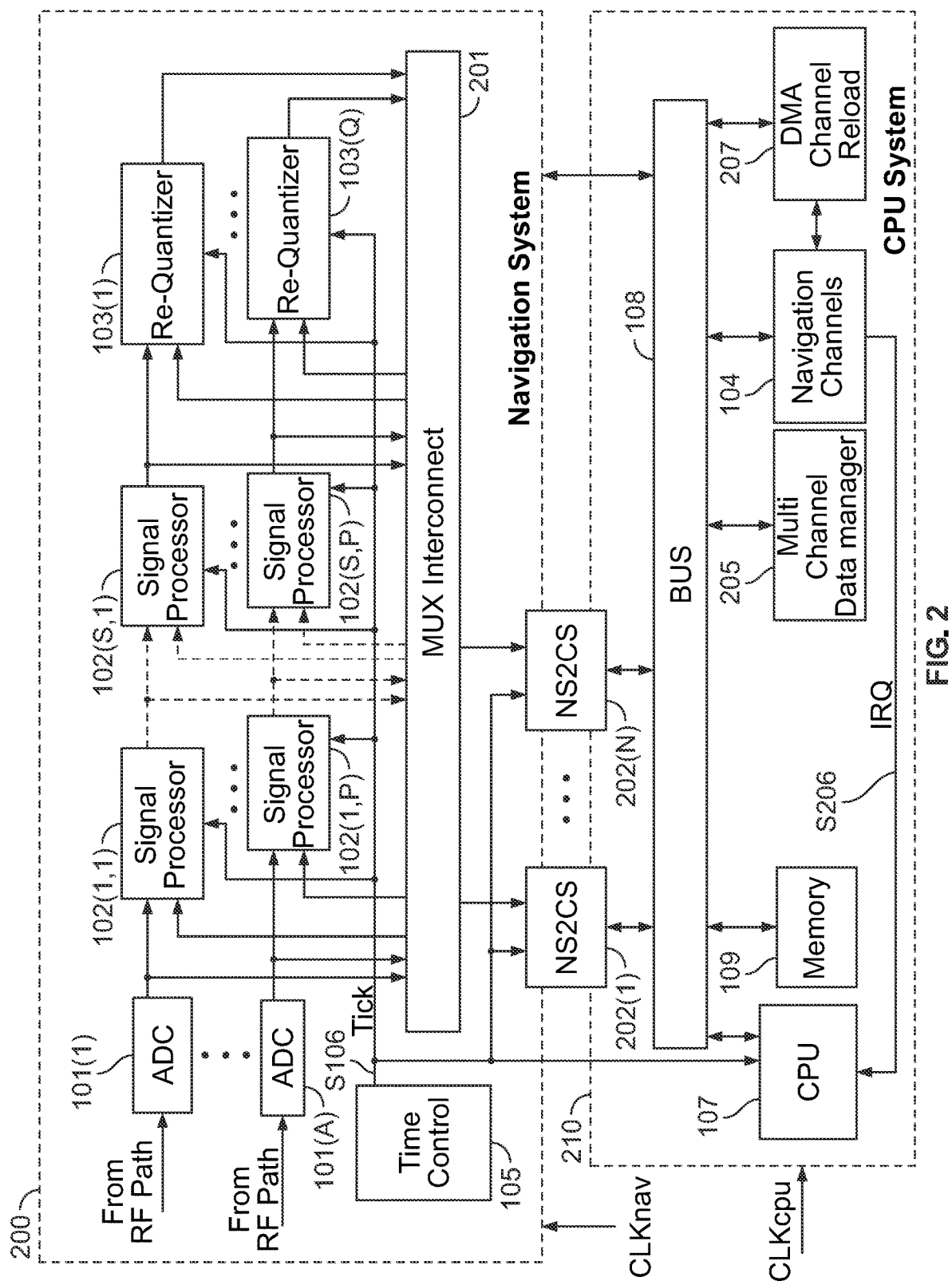
FIG. 2 shows a GNSS receiver according to one embodiment.

FIG. 2 shows components of a GNSS receiver 2 comprising navigation system 200, CPU system 210. Navigation system 200 also comprises "N" number of interface blocks Navigation system to CPU System (NS2CS) interface blocks as shown by NS2CS 202(1) . . . 202(N) interface blocks which convert data received from navigation system 200 before being transmitted to CPU system 210. Navigation system 200 comprises a plurality of ADC 101, a plurality of signal processors 102, a plurality of re-quantizers 103, time control 105, MUX interconnect 201, and a plurality of NS2CS interface blocks 202. CPU system 210 comprises BUS 108, CPU 107, memory 109, multi-channel data manager 205, Navigation channels 104 and DMA channel reload 207. NS2CS 202(1) . . . 202(N) interface blocks will be collectively referred to as NS2CS interface blocks 202. FIG. 2 shows interrupt request signal (IRQ) S206 which is output from multi-channel data manager 205 and input to CPU 107.

GNSS signals received by an antenna are transmitted to one or more RF-paths that are connected to the input of ADCs 101. Digitized signals output from ADCs 101 are input to signal processors 102 where the signals are processed. The outputs of signal processors 102 are input to re-quantizers 103 where the signals are re-quantized into low-bit data.

The output of re-quantizer 103, ADC 101 and signal processor 102, are input to MUX interconnect 201. MUX interconnect 201 transmits the output of re-quantizers 103, ADCs 101, and signal processors 102 to the input of NS2CS interface blocks 202(1) . . . 202 (N) where the signals can be further processed. Time control 105 generates tick signal S106 which is used to control various components and is input to: signal processor 102, re-quantizer 103, CPU 107, NS2CS interface block 202.

CPU 107 uses tick signal S106 to synchronize control among signal processor 102, re-quantizer 103, NS2CS interface block 202.

Navigation system 200 operates at a rate based on clock CLKnav. CPU system 210 operates at a rate based on clock CLKcpu. The CLKnav and CLKcpu clocks are generally asynchronous, and the CLKcpu frequency is substantially higher than the CLKnav frequency. In one embodiment, the frequency of the CPU 107 is synchronous and substantially higher than CLKcpu.

In another embodiment, the frequency of operation of navigation channels 104, multi-channel data manager 205, and DMA channel reload 207 is synchronous and substantially higher than CLKcpu In one embodiment, the following components are connected to BUS 108: multi-channel data manager 205, CPU 107, memory 109, navigation system 200, NS2CS interface block 202, DMA channel reload 207 and navigation channels 104.

CPU 107 controls the following components via BUS 108: multi-channel data manager 205, navigation system 200, NS2CS interface blocks 202, DMA channel reload 207 and navigation channels 104.

In one embodiment, CPU 107 is configured to write data to memory 109 via BUS 108. In one embodiment, memory 109 is used to store data.

The following components can be a source of data: ADC 101, signal processors 102, re-quantizers 103, NS2CS interface blocks 202 and CPU 107.

In one embodiment, after processing, each of re-quantizers 103 form the same number of samples in a period of time. The outputs of each re-quantizer 103 are collected into one stream and transmitted via MUX interconnect 201 to the input of one NS2CS interface block 202 for further processing. In one embodiment, one NS2CS interface block 202 is allocated for further processing.

In one embodiment, the output of re-quantizer 103 is input to NS2CS interface block 202 via MUX interconnect 201. NS2CS interface block 202, in one embodiment, writes data from navigation system 200 via BUS 108 into: memory 109, and/or CPU 107.

Multi-channel data manager 205 reads data from memory 109 via BUS 108. Multi-channel data manager 205 transmits data from memory 109 to navigation channels 104, where they are processed. After completion of operation multi-channel data manager 205 outputs IRQ signal S206 to CPU 107.

CPU 107, using tick signal S106 and IRQs (e.g., IRQ S206) from multi-channel data manager 205, and data from interface blocks NS2CS 202, controls data streams between: multi-channel data manager 205, NS2CS interface blocks 202.

DMA channel reload 207 is used to save/load the current state of navigation channels 104 between data processing. DMA channel reload 207 saves the current state of navigation channels 104 in memory 109. DMA channel reload 207 takes data from memory 109 and loads the current state into navigation channels 104. During operation DMA channel reload 207 exchanges information with multi-channel data manager 205.

Figure 3:
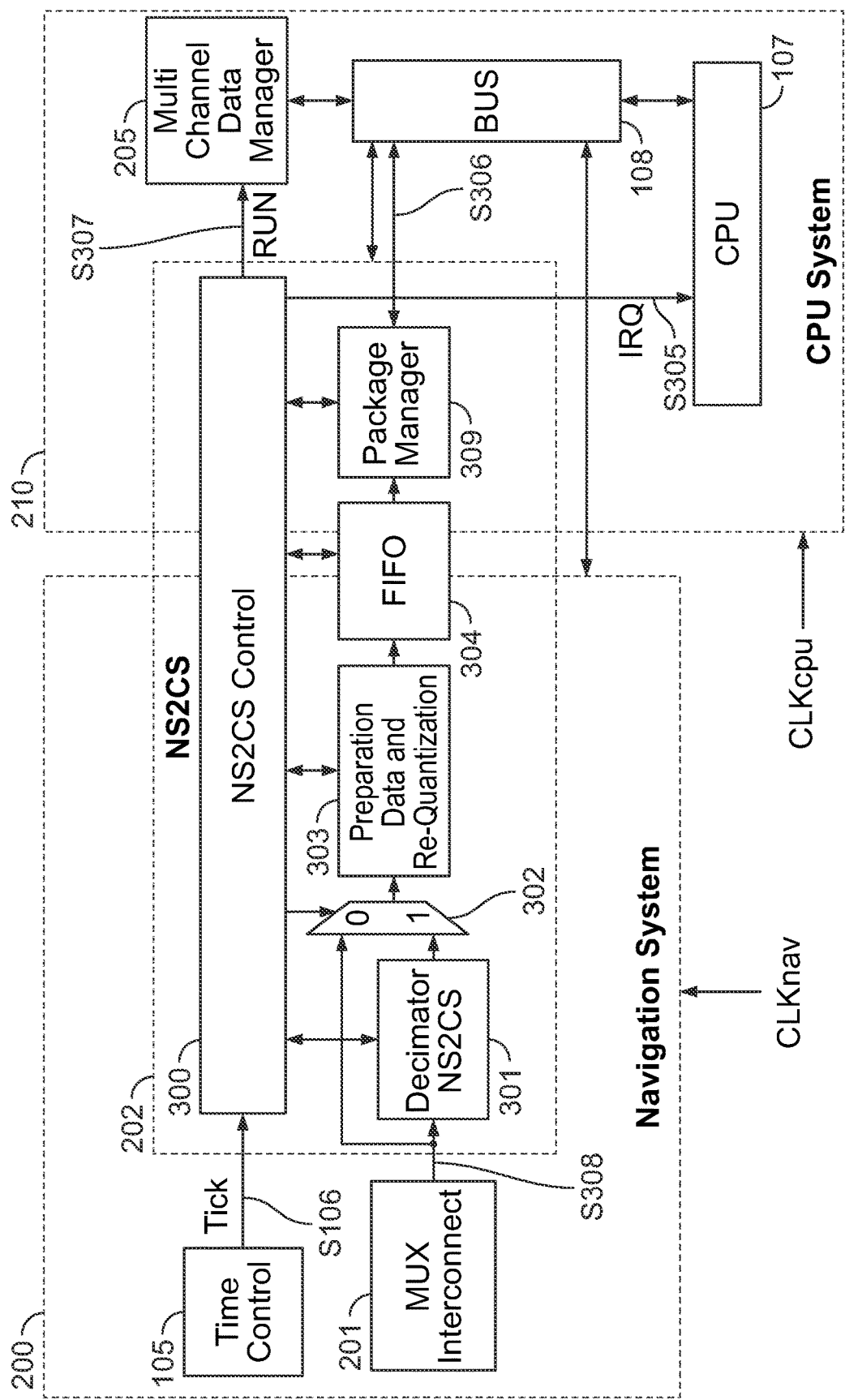
FIG. 3 shows a navigation system in communication with a CPU system via an NS2CS interface block according to one embodiment.

In one embodiment, GNSS receiver has allocated memory (not shown in figures), and only a plurality of NS2CS interface blocks 202 and multi-channel data manager 205 have access to the allocated memory. Packages from a plurality of NS2CS interface blocks 202 are written in the allocated memory. Multi-channel data manager 205 reads packages from the allocated memory. FIG. 3 shows navigation system 200 in communication with CPU system 210 via NS2CS interface block 202 according to one embodiment.

NS2CS interface block 202, in one embodiment, comprises NS2CS control 300 which receives tick signal S106 from time control 105. NS2CS control 300 is in communication with decimator NS2CS 301. Decimator NS2CS 301 and MUX interconnect 201 transmit signals to multiplexer 302 which is in communication with NS2CS control 300. MUX interconnect 201 transmits continuous data stream S308 to multiplexer 302 and to decimator NS2CS 301. Signals output from multiplexer 302 are transmitted to preparation data and re-quantizer 303 which is in communication with NS2CS control 300. Preparation data and re-quantizer 303 transmits signals to asynchronous asymmetric first in, first out buffer (also referred to as FIFO) 304 which is in communication with NS2CS control 300. FIFO 304 transmits signals to package manager 309 which is in communication with NS2CS control 300. Package manager 309 is in communication with BUS 108 via signal S306. BUS 108 is in communication with CPU 107 and multi-channel data manager 205. Multi-channel data manager 205 also receives RUN signal S307 and signal IRQ S305 from NS2CS control 300. CPU 107 also receives signal IRQ S305 from NS2CS control 300.

Continuous data stream signal S308 from MUX Interconnect 201 is input to decimator NS2CS 301, if needed, and the signal is decimated with different decimation coefficients. A signal output from decimator NS2CS 301 is input to preparation data and re-quantizer 303.

Preparation data and re-quantizer 303 prepares data and, if needed, re-quantizes data into low-bit data.

If decimation is not used, then continuous data stream signal S308 from MUX Interconnect 201 is input to multiplexer 302 and is then transmitted to preparation data and re-quantizer 303.

Data output from preparation data and re-quantizer 303 is input to FIFO 304. The output of FIFO 304 is then input to package manager 309, where the data is converted into a package with the given sample number.

In one embodiment, before starting operation, NS2CS control 300 configures: decimator NS2CS 301 (if necessary), multiplexer 302, preparation data and re-quantizer 303, FIFO 304, and package manager 309.

In one embodiment, NS2CS interface block 202 performs data pre-processing. NS2CS interface block 202 converts data from MUX Interconnect 201 into the required format for multi-channel data manager 205, CPU 107, memory 109 (shown in FIG. 2). In one embodiment, the output data stream from NS2CS interface block 202 is a package.

In one embodiment, a package is the number of samples assigned/set by CPU 107. Samples are data over one clock cycle CLKnav. NS2CS interface block 202 starts to generate a package according to tick signal S106. In one embodiment, NS2CS interface block 202 generates a package and puts it in memory 109 (shown in FIG. 2).

In one embodiment, data in a package can be processed in: navigation channels 104 (shown in FIG. 2) using multi-channel data manager 205, CPU 107.

In one embodiment, a package can be generated by: CPU 107, NS2CS interface block 202.

In one embodiment, FIFO 304 re-synchronizes data from clock CLKnav to clock CLKcpu.

In one embodiment, during operation, NS2CS interface block 202 stacks data at given addresses and generates an interrupt request signal S305 for CPU 107. If necessary, data is written cyclically. In another embodiment, decimator NS2CS 301 is removed to reduce NS2CS interface block 202 space required on the ASIC.

NS2CS interface block 202 operates in two modes: single package mode and multi packages mode.

Figure 4A:
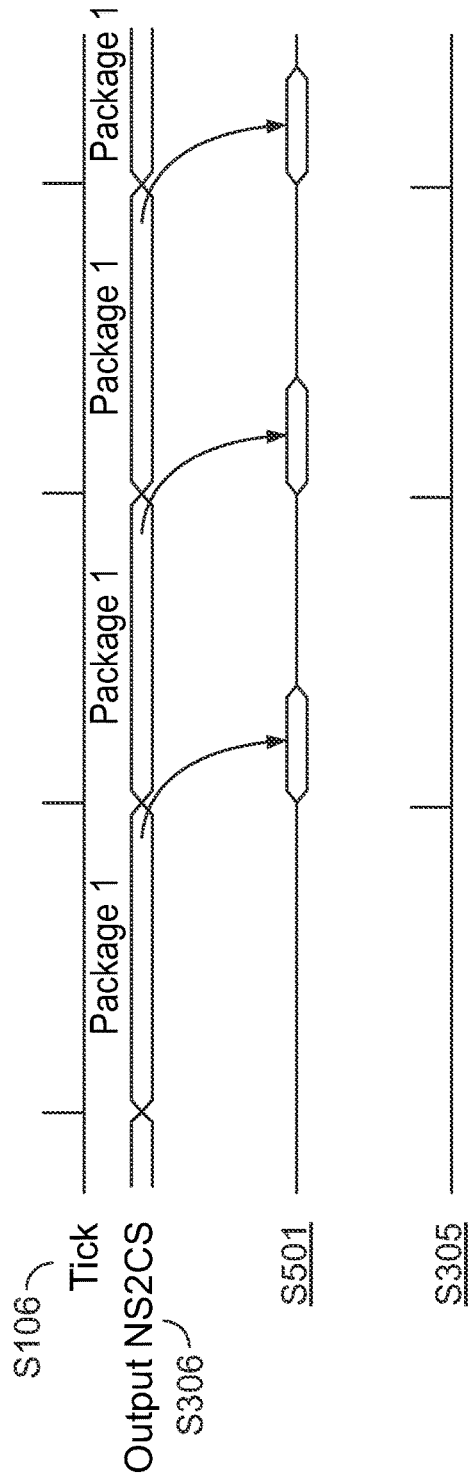
FIG. 4A shows a signal graph of an NS2CS interface block operating in a single package mode according to one embodiment.

FIG. 4A shows a signal graph of NS2CS interface block 202 operating in single package mode. During one tick signal S106 one package is formed. When the package is formed, IRQ signal S305 is generated and input to CPU 107 and multi-channel data manager 205. In this mode, CPU 107 has control of data stream using tick signal S106 and IRQ signals S305 from NS2CS interface block 202. In one embodiment, multi-channel data manager 205 has control of data stream using IRQ signals S305 from NS2CS interface block 202. In one embodiment, multi-channel data manager 205 forms multi-bit data signal S501 and enabling signal S502 for navigation channels 104.

Figure 4B:
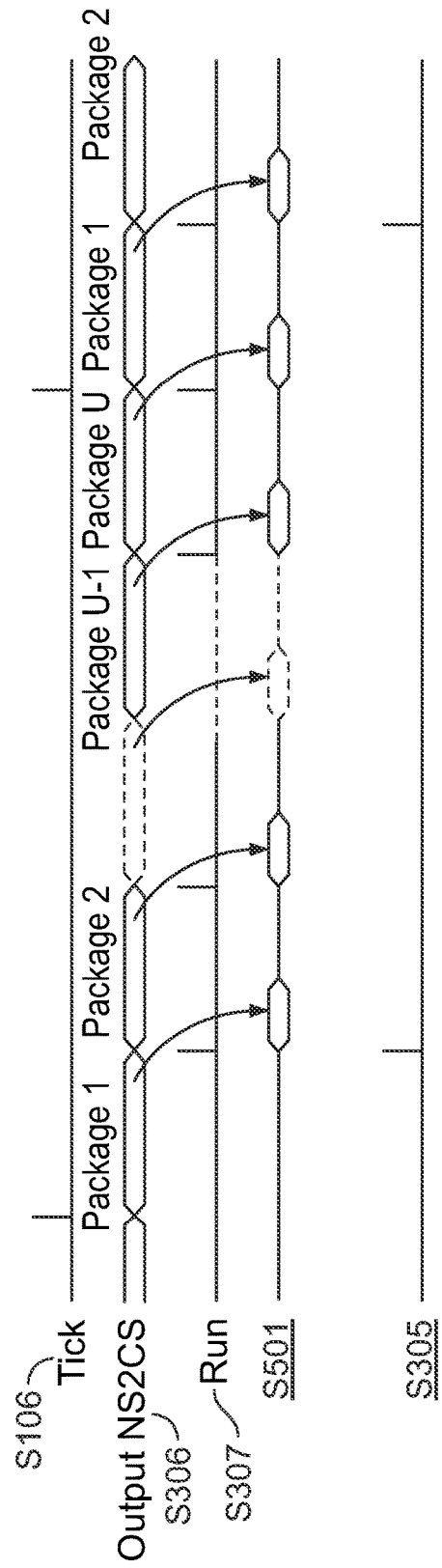
FIG. 4B shows a signal graph of an NS2CS interface block operating in a multi packages mode according to an embodiment.

FIG. 4B shows a signal graph of NS2CS interface block 202 operating in multi packages mode. Time control 105 generates tick signal S106, according to which data processing starts. During one period of tick signal S106, U packages are formed. When the first package had been formed and has been written to memory 109, signal S305 is generated. After completion of each package RUN signal S307 is generated.

In one embodiment, packages 1 . . . U have the same size. In another embodiment, packages 1 . . . U have different sizes. Multi-channel data manager 205 reads a package from memory 109 and forms multi-bit data signal S501 and S502 for navigation channels 104, based on signal S307 and IRQ signals S305. When necessary, an additional operation with respect to a package is performed, specifically, any time after writing a package to memory 109, NS2CS interface block generates the S305 and S307 signals.

FIG. 5 shows signals received by multi-channel data manager 205. Signals received by multi-channel data manager 205 include "N" number of signals from the output of interface blocks NS2CS 202(1) . . . 202 (N) as shown by signals S307(1) . . . S307(N). The signals received by multi-channel data manager as described are used in a first-try automatic mode.

Multi-channel data manager 205, using signals S307 reads packages from memory 109 and generates signals S501 (see FIGS. 4A and 4B) and S502 at the same time from a plurality of NS2CS interface blocks 202.

When using decimation, the number of samples at the input of NS2CS interface block 202 is reduced, which reduces the size of packages. In one embodiment, the NS2CS interface blocks convert the received digitized signal into a package having a pre-set or designated size.

Figure 6:
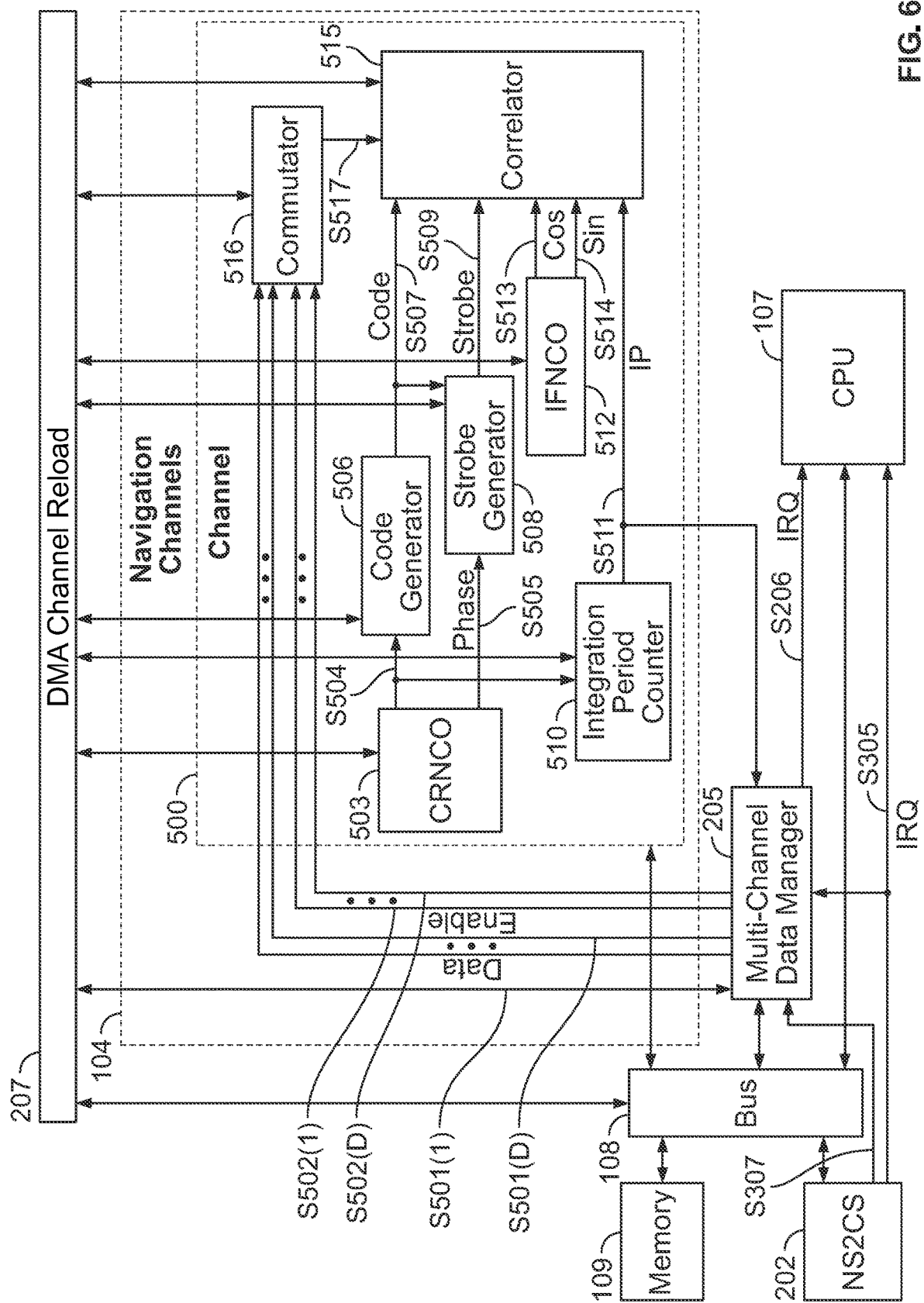
FIG. 6 shows navigation channels in communication with the components of the NS2CS CPU system of FIG. 3 according to one embodiment.

FIG. 6 shows navigation channels in communication with the components of NS2CS CPU system 210 of FIG. 3 according to an embodiment. As shown in FIG. 6, navigation channels 104 includes at least one channel 500. Channel 500 receives "D" number of signals as shown by signals S501(1) . . . S501 (D) and signals enable S502(1) . . . S502 (D) from multi-channel data manager 205 and comprises code rate NCO (CRNCO) 503, code generator 506, strobe generator 508, integration period counter 510, Intermediate Frequency NCO (IFNCO) 512, correlator 515, and commutator 516. Signals that are transmitted and/or received include code rate signal S504, code phase signal S505, code signal S507, strobe signal S509, integration period (IP) signal S511, cosine signal S513, sin signal S514, and output signal S517 from commutator 516.

In one embodiment, navigation channels 104 consists of multiple channels 500. FIG. 6 shows channel 500 which is one of the multiple channels. In one embodiment, a package can contain data from one or more data sources. Data from different sources can be combined in one package over a time period with the same number of samples. Low-bit data received from the outputs of different re-quantizers 103 (shown in FIG. 2) are multiplexed in a single multi-digit word and input to an allocated NS2CS interface block 202 to generate a common package which is transmitted to memory 109 where it is saved. Multi-channel data manager 205 reads the package from memory 109 and converts data from re-quantizers 103(1) . . . 103(Q) (shown in FIG. 2) into "D" number of signals as shown by signals S501(1) . . . S501(D) and forms signals enable S502(1) . . . S502 (D). Data from each of re-quantizers 103(1) . . . 103(Q) is transmitted as signals S501(1) . . . S501(D) and signals enable S502(1) . . . S502 (D), respectively. Signals S501(1 . . . D) and S502(1 . . . D) are transmitted from multi-channel data manager 205 to the input of Commutator 516. Signals S501(1) and S502(1) are used at the same time. Signals S501(D) and S502(D) are used simultaneously. CPU 107 with commutator 516 connects channel 500 to signal S501(*i*) and S502(*i*). Here, "*i*" is any number from 1 . . . D. When signal S502(*i*) is active, processing of data S501 (*i*) in channel 500 is enabled, in the channel 500 internal clock CLKcpu is enabled. When signal S502(*i*) is inactive and processing of S501 (*i*) in channel 500 stops, in the channel 500 internal clock CLKcpu is disabled.

In one embodiment, multi-channel data manager 205 sends one package to navigation channels 104 during generation of the next package. In other embodiments, multi-channel data manager 205 sends plurality of packages formed in same time to navigation channels 104 during parallel generation of the next packages. CPU 107 via BUS 108 controls multi-channel data manager 205 and DMA channel reload 207. Multi-channel data manager 205 controls DMA channel reload 207 as well. Before operation, CPU 107 adjusts multi-channel data manager 205 to operate in one of several modes.

Multi-channel data manager 205 can operate in the following modes: CPU fully controlled mode, first-try automatic mode and automatic control mode.

In the CPU fully controlled mode according to one embodiment, CPU 107 controls multi-channel data manager 205, DMA channel reload 207 and channel 500. In one embodiment, the CPU fully controlled mode is only used when NS2CS interface block 202 operates in single package mode. Time control 105 generates tick signal S106, which sets the rate at which data is processed. When a package is formed, signal S305 is generated. According to signal S305, CPU 107 writes a control command in navigation channels 104 and then, according to a command from CPU 107, multi-channel data manager 205 sends the package. When the package is sent, multi-channel data manager 205 generates signal S206. CPU 107 reads data from navigation channels 104 based on signal S206 An advantage of this mode is a more flexible chain of data processing, since CPU 107 can itself determine to which block it will send data.

In the first-try automatic mode according to one embodiment, CPU 107 controls multi-channel data manager 205 and channels 500 using S305 and signals S307 (shown in FIGS. 5, and 6) sends packages via channels 500. In one embodiment, the first-try automatic mode is used only when NS2CS interface block 202 operates in multi packages mode. Time control 105 generates tick signal S106, which sets the rate at which data is processed. After the first package is completely sent, signal S305 is generated. CPU 107, according to signal S305, sends a control command to navigation channels 104, and further, on CPU command, multi-channel data manager 205 sends the package. At the end of each package excluding first package, according to RUN signal S307, multi-channel data manager 205 is run and the package is sent to navigation channels 104. After the last package, based on current tick signal S106, multi-channel data manager 205 generates signal S206. CPU 107 according to signal S206 reads data from navigation channels 104. An advantage of this mode is that the smaller packages require less memory. In addition, power consumption is less because this mode required less control form the CPU.

In Automatic control mode according to one embodiment, multi-channel data manager 205 controls channel 500 and DMA channel reload 207. CPU 107 communications data with multi-channel data manager 205 via memory 109. This mode multi-channel data manager 205 uses signal S206, signal S305, and signal S307.

In the Automatic control mode according to one embodiment, NS2CS interface block 202 operates in single package mode. Time control 105 generates tick signal S106, which sets the rate at which data is processed. In necessary, CPU 107 write control commands to memory 109. When a package is formed, signal S305 is generated. According to signal S305, multi-channel data manager 205 reads control commands from memory 109 and write the control commands in navigation channels 104 and then, sends the package. When the package is sent, multi-channel data manager 205 read ready data from channels 500 and write it to memory 109, then generates signal S206. CPU 107 reads ready data from memory 109 based on signal S206. In one embodiment, multi-channel data manager 205 automatically controls DMA channels reload 207 for reusing channels 500. An advantage of this mode is a minimum using CPU and reusing channels 500.

In the Automatic control mode according to one embodiment, NS2CS interface block 202 operates in multi packages mode. Time control 105 generates tick signal S106, which sets the rate at which data is processed. After the first package is completely sent, signal S305 is generated. Multi-channel data manager 205 reads control commands from memory 109 and write the control commands in navigation channels 104 and then, sends the package. At the end of each package excluding first package, according to RUN signal S307, multi-channel data manager 205 is run and the package is sent to navigation channels 104. After the last package, based on current tick signal S106, multi-channel data manager 205 read ready data from channels 500 and write it to memory 109, then generates signal S206. CPU 107 reads ready data from memory 109 based on signal S206. In one embodiment, multi-channel data manager 205 automatically controls DMA channels reload 207 for reusing channels 500. An advantage of this mode is a minimum using CPU, reusing channels 500 and is used the smaller packages require less memory.

Multi-channel data manager 205 in the CPU fully controlled mode generates IRQ signal S206 at the end of the package, after data is sent to channels 500, that corresponds to the period of tick signal S106.

Multi-channel data manager 205 in the First-try automatic mode generates IRQ signal S206 one time for some packages, when data transmission to channels 500 is over, and IRQ signal S206 corresponds to the period of tick signal S106.

Signals S501(1) ... S501(D) and S502(1) ... S502(D) are transmitted from multi-channel data manager 205 to the input of commutator 516. CPU 107, in conjunction with commutator 516, connects channel 500 to signal S501(i) and S502(i), where i is any number from 1 to D.

While multi-channel data manager 205 is reading a package from memory 109, if signal S502(i) inactive, it indicates the package is finish or did not have time 205 to read the next data from memory 109, channels 500 stops data processing for this period of time.

Navigation channels 104 consists of a set of channels 500. CPU 107 controls channels 500 via BUS 108. In channels 500, each sample from a package is processed in one clock CLKcpu.

In one embodiment, the period of tick signal S106 is smaller than the period of integration period signal S511.

A current channel 500 configuration is a group of settings or parameters defined for the selected processing mode of the GNSS signal. For example, the parameters are signal S501 (i) (referred to as the selected enabling signal S502(i)) and the configuration of code generator 506.

In one embodiment, CPU 107 configures, controls, and retrieves data from channel 500 when multi-channel data manager 205 does not send data signal S501. Before operation, CPU 107 sets the configuration of components and parameters of channel 500 as follows: code frequency and initial code phase in code rate NCO 503, code generator 506, strobe generator 508, duration of integration period signal S511 in integration period counter 510, intermediate frequency and initial code phase in intermediate frequency NCO 512, and commutator 516. In one embodiment, the multi-channel data manager fixes the data readiness in the plurality of channels based on an integration period signal, and the CPU reads them after data processing.

In one embodiment, channel 500 processes input signals S501(i) from the beginning to the end of a package.

CRNCO 503 generates code frequency signal S504 which is input to code generator 506 and integration period counter 510. Code generator 506 generates code signal S507 at the code rate of signal S504. Code signal S507 is input to strobe generator 508 and correlator 515. CRNCO 503 generates code phase signal S505 which is input to strobe generator 508. Strobe generator 508 using signals S507 and S505 generates strobe signal S509 which is input to Correlator 515. IFNCO 512 generates signals Cosine (Cos) S513 and Sinus (Sin) S514 having intermediate frequency. Signals S513 and S514 are input to correlator 515. From commutator 516, signal S517 is input to correlator 515. Integration period counter 510 generates integration period signal S511 based on code rate signal S504. Integration period signal S511 is input to correlator 515 and multi-channel data manager 205. In one embodiment, signal S517 is signal S501 (i).

In correlator 515, signal S517 is multiplied by Cos signal S513 and code signal S507 and the result of the multiplication is accumulated over integration period signal S511. According to integration period signal S511, the accumulated value is saved in buffer register 1 (component I shown below), and CPU 107, if needed, takes this value, and the accumulated value is zeroed.

$$I = \sum_{1}^{IP} S517 * S513 * S507$$

In correlator 515, signal S517 is multiplied by Sin signal S514 and code signal S507 and the result of the multiplication is accumulated over integration period signal S511. According to signal S511, the accumulated value is saved in buffer register 2 (component Q shown below), and CPU 107, if needed, takes this value, and the accumulated value is zeroed.

$$Q = \sum_{1}^{IP} S517 * S514 * S507$$

In correlator 515, signal S517 is multiplied by signal Cos S513 and strobe signal S509 and the result of the multiplication is accumulated over integration period signal S511. According to signal S511 the accumulated value is saved in buffer register 3 (component dI shown below), and CPU 107, if needed, takes this value, and the accumulated value is zeroed.

$$dI = \sum_{1}^{IP} S517 * S513 * S509\ln$$

correlator 515, signal S517 is multiplied by Sin signal S514 and strobe signal S509 and the result of the multiplication is accumulated over integration period signal S511. According to signal S511 the accumulated value is saved in buffer register 4 (component dQ shown below), and CPU 107, if needed, takes this value, and the accumulated value is zeroed.

$$dQ = \sum_{1}^{IP} S517 * S514 * S509\ln$$

one embodiment CPU fully controlled or first-try automatic modes, based on signal S206, CPU 107, if signal S511 in multi-channel data manager 205 is available, reads ready data from channel 500 including values from buffer registers 1 through 4 (components I, Q, dI, dQ). Note that it is also possible to read code phase CRNCO 503, intermediate frequency phase in IFNCO 512 and the state of integration period counter 510 and so on.

In one embodiment Automatic control mode, based on signal S206, CPU 107, if signal S511 in multi-channel data manager 205 is available, reads ready data from memory 109 including values from buffer registers 1 through 4 (components I, Q, dI, dQ). Multi-channel data manager 205 can configure for reads additional data channel 500 and writes to memory 109, for examples code phase CRNCO 503, intermediate frequency phase in IFNCO 512 and the state of integration period counter 510 and so on. CPU 107 reads additional data from memory 109.

In one embodiment, before processing according to signal S501 (i) CPU 107 can control/modify parameters of channel 500, including changing code frequency in CRNCO 503, setting code phase shift in CRNCO 503, changing intermediate frequency in IFNCO 512, setting intermediate frequency phase shift in IFNCO 512

Operation of strobe generator 508 is described in U.S. Pat. No. 7,764,226 B1, the disclosure of which is incorporated herein by reference in its entirety.

In one embodiment, multi-channel data manager 205 controls DMA channel reload 207. DMA channel reload 207 is connected to a number of channels 500, BUS 108, and multi-channel data manager 205. DMA channel reload 207 is serves each of channels 500.

In one embodiment, DMA channel reload is connected to components of each of channels 500 including Code Rate NCO (CRNCO) 503, code generator 506, strobe generator 508, integration period counter 510, Intermediate Frequency NCO (IFNCO) 512, correlator 515, and commutator 516.

Each of channels 500 when processing a signal has a current state which includes a current configuration of a respective channel 500 and a current state of operational logic, for example, current CRNCO 503 phase and IFNCO 512 phase.

Figure 7A:
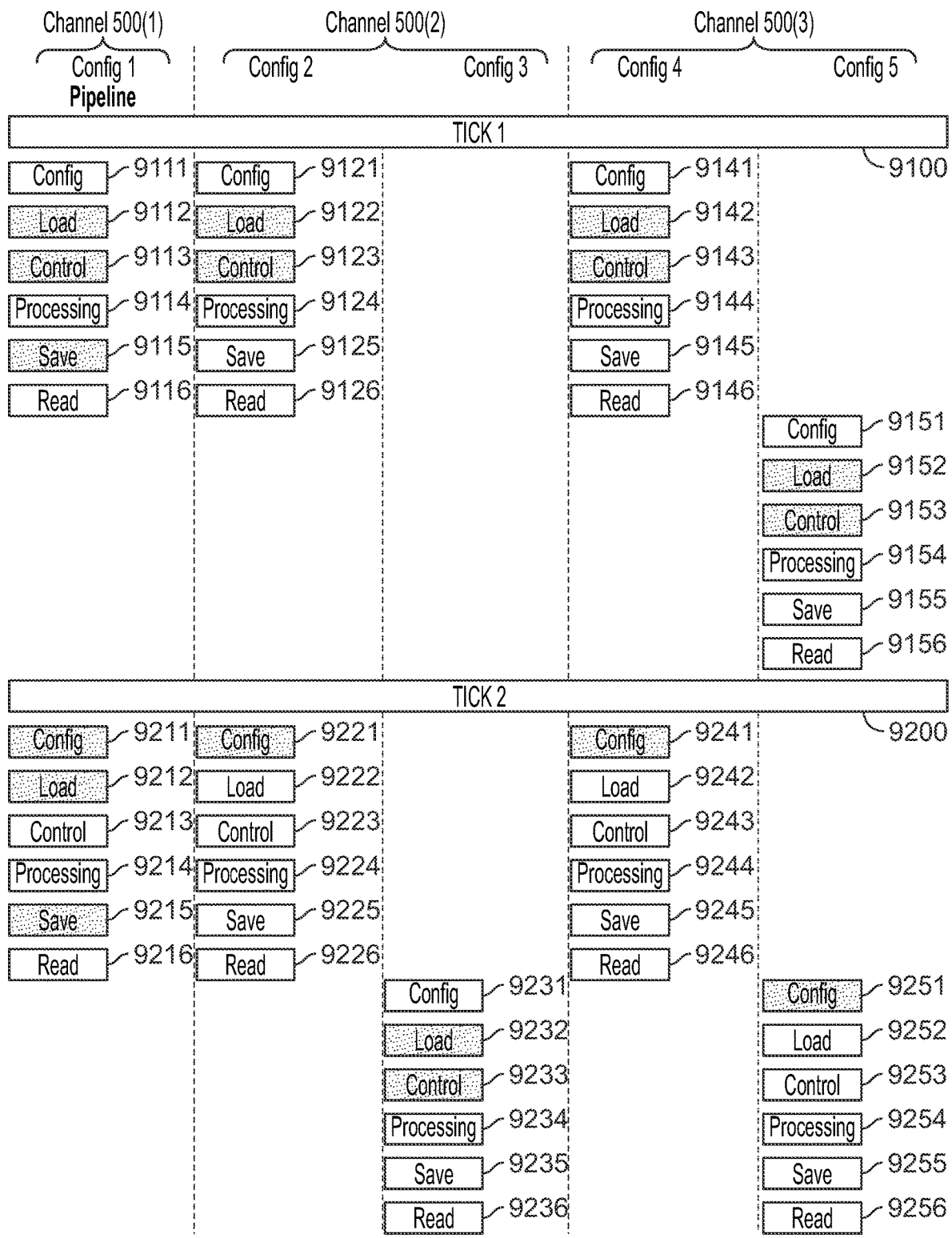
FIG. 7A shows package processing steps according to one embodiment.
Figure 7A:
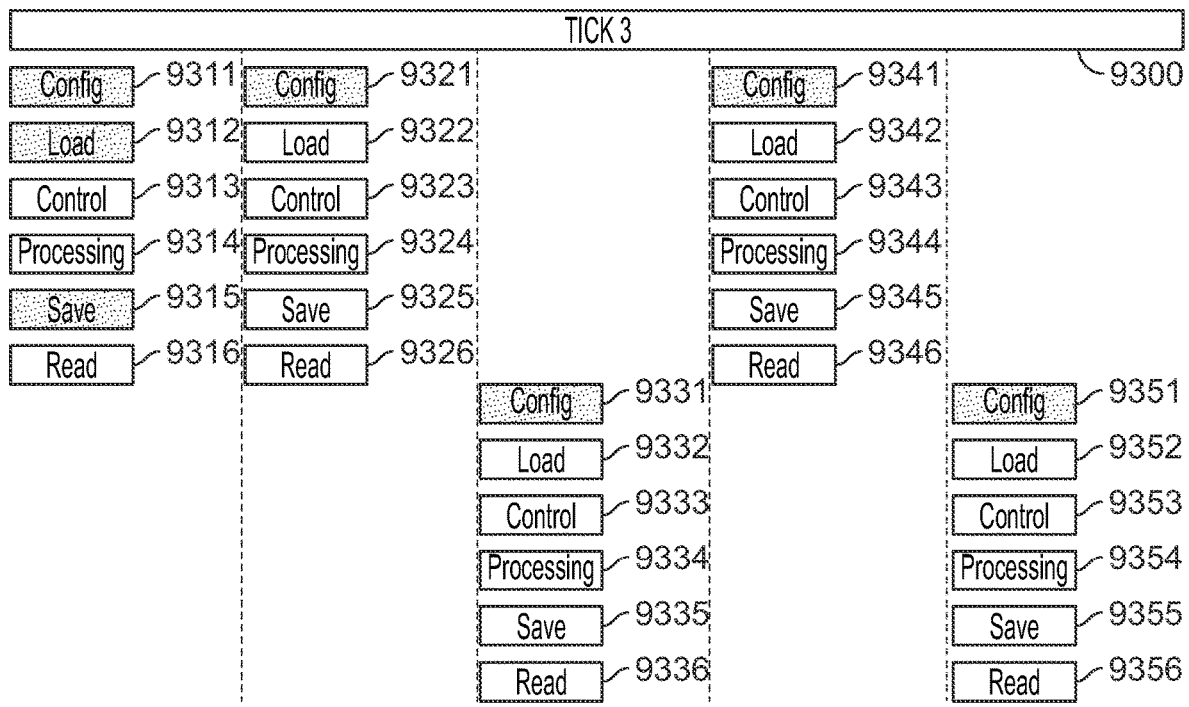

FIG. 7A shows package processing steps which are described as follows.

Signals S305 and S307 indicate to multi-channel data manager 205 that there is a new package in memory 109. CPU 107, using a combination of signals S106, S206, S307 and S305 controls GNSS signals processed in channels 500. Package processing with multi-channel data manager 205 and DMA channel reload 207 includes the following steps. The table below describes package processing steps. The designation column of the table indicates that the last digit of the labels of FIG. 7A are associated with a particular step (i.e., labels 9111, 9211, and 9311 are each associated with the configuration step, labels 9112, 9212, and 9312 are each associated with the load step, labels 9113, 9213, and 9313 are each associated with the control step, etc.)

| Step | Designation | Description |
|---|---|---|
| Config | ***1 | Channel 500 is prepared to process a GNSS signal, a new configuration of Channel 500 is set Or previously run GNSS signal processing is stopped. For Automatic control mode, ready data is selected which should be read at step Read from Channel 500. |
| Load | ***2 | 207 loads the current state in Channel 500 from Memory 109 |
| Control | ***3 | A control command is sent to Channel 500. If needed, in Automatic control mode ready data is selected, which need to be read from Channel 500 at step Read. |
| Processing | ***4 | Channel 500 processes S501(i) when active S502(i) |
| Save | ***5 | 207 saves in Memory 109 the current state of Channel 500 |

-continued

| Step | Designation | Description |
|---|---|---|
| Read | ***6 | Automatic control mode multi-channel data manager 205 reads ready data is taken from Channel 500 and save to Memory 109, further processed. Or other modes CPU 107 reads ready data from Channel 500, further processed |

In one embodiment, during the formation of a new package, all the steps required for each configuration of channel must be completed.

In CPU fully controlled mode configuration and control steps are controlled by CPU 107. During the configuration and control steps, the CPU 107 controls channel 500 before sending a package to channel 500. The read step is controlled by CPU 107. At the read step, the CPU 107 reads the ready data from the channel 500, after processing a package in channel 500. Multi-channel data manager 205 generates IRQ signal S206 after processing a package (after the processing step).

In first-try automatic mode, configuration and control steps are controlled by CPU 107. CPU 107, during configuration and control steps, controls channel 500, before the first package formed over tick signal S106 is sent to channel 500. The read step is controlled by CPU 107. In the read step, the CPU 107 reads the ready data from the channel 500 after channel 500 has processed the last package generated during the tick signal S106 period. Multi-channel data manager 205 generates IRQ signal S206, after processing, in channel 500, the last package (after the processing step) generated during the tick signal S106 period.

Load and Save steps are used only in Automatic control mode and they allow processing of GNSS signals in some configurations using channel 500. Multi-channel data manager 205 generates interrupt signal S206 after Read step and informs CPU 107 that data are put into memory 109. Multi-channel data manager 205, receiving signals S305, S307 indicates that there are new packages in memory 109. Multi-channel data manager 205 then sends packages in channels 500. CPU 107, using signals S106, S206 and S305 prepares data for the Config and Control steps and reads data after the Read step.

In one embodiment, in Automatic control mode, when NS2CS interface block 202 operates in single package mode, the Config and Control steps are controlled by multi-channel data manager 205. The Load and Save steps are controlled by DMA channel reload 207. CPU 107 writes control commands in memory 109 for the Config and Control steps. Before sending a package to channel 500 Config, Load and Control steps are executed. In Config step multi-channel data manager 205 reads control commands from memory 109 and writes commands in channel 500. In Load step DMA channel reload 207 reads data from memory 109 and writes to channel 500. In Control step multi-channel data manager 205 reads control commands from memory 109 and writes commands in channel 500. Then it is executed Processing step is controlled by multi-channel data manager 205. After sending a package to channel 500 Save and Read steps executes. In Save step DMA channel reload 207 reads data from channel 500 and writes to memory 109. The Read step is controlled by multi-channel data manager 205. After processing the package in channel 500, in the Read step, multi-channel data manager 205 reads ready data from channel 500 and writes to memory 109 and generates IRQ signal S206. Based on signal S206, CPU 107 reads ready data from memory 109.

In one embodiment, in Automatic control mode, when NS2CS 202 operates in multi packages mode, the Config and Control steps are controlled by multi-channel data manager 205. The Load and Save steps are controlled by 207. CPU 107 writes control commands in memory 109 for the Config and Control steps. Before sending the first package generated during the period of tick signal S106 to channel 500 Config, Load, and Control steps are executed. In Config step multi-channel data manager 205 reads control commands from memory 109 and writes commands in channel 500. In Load step DMA channel reload 207 reads data from memory 109 and writes to channel 500. In Control step multi-channel data manager 205 reads control commands from memory 109 and writes commands in channel 500. Using signal S305 multi-channel data manager 205 executes Processing step and sends the first package generated during the period of tick signal S106. Using signal S206, multi-channel data manager 205 executes Processing step and sends for each package excluding first package. After the last package is processed in channel 500 during the period of tick signal S106, Save and Read steps are executed. In Save step, DMA channel reload 207 reads data from channel 500 and writes to memory 109. The Read step is controlled by multi-channel data manager 205. After processing the last package generated during the period of tick signal S106 in channel 500, in the Read step, multi-channel data manager 205 reads ready data from channel 500 and writes to memory 109 and generates IRQ signal S206. Based on signal S206, CPU 107 reads ready data from memory 109. In one embodiment, the following steps are performed in the sequence as shown:

Configuration Step:

For a plurality of channels 500, configuration steps (e.g., steps 9\*\*1 shown in FIG. 7A) can be used one after another. If it is needed to run a new GNSS signal processing, channels 500 is set to a new configuration. channels 500 can also stop GNSS signal processing if needed.

Load Step:

For channel 500, where Load steps (e.g., steps 9\*\*2 shown in FIG. 7A) are used in processing, Load steps are performed one after another and the current state of channel 500 is read from memory 109 and written to channel 500, for continuous processing earlier GNSS signals using configurations channel 500 are saved to memory 109.

Control Step:

For a plurality of channels 500, control steps (e.g., steps 9\*\*3 shown in FIG. 7A) are used one after another. If needed, control commands are sent to channel 500.

Processing Step:

Processing steps (e.g., steps 9\*\*4 shown in FIG. 7A) are applied for all channels 500 at the same time (in parallel). Packages (represented by signal S501) are sent to all channels 500 simultaneously. Each channel 500 processes its own package received as signal S501 (*i*).

Save Step:

Save steps (e.g., steps 9\*\*5 shown in FIG. 7A) are performed sequentially, one after another, where Save steps are applied after processing. The current state of channel 500 is written to memory 109, current states channels 500 write to memory 109 for continuous is processing GNSS signals, this data which wrote to memory 109 will used next Load steps.

Read Step:

If needed, for a plurality of channels 500, read steps (e.g., steps 9\*\*6 shown in FIG. 7A) are used sequentially. If signal S511 is available in multi-channel data manager 205, ready data is retrieved from channels 500.

In one embodiment, CPU 107 can, if necessary, read data from channels 500 without using multi-channel data manager 205, temporarily stopping the operation of multi-channel data manager 205 after signal S206.

In one embodiment, channels 500 do not process previously configured configurations and CPU 107 will not set one or more new configurations of channels 500, then multi-channel data manager 205 does not send a package (i.e., multi-channel data manager 205 skips all steps) to channels 500 and generates signal S206.

In one embodiment, in Automatic control mode, signal S206 is formed only after the Read steps of the last processed package of the current period tick signal S106.

Load and Save steps are used when processing several configurations by one of channels 500. Using Load and Save steps allows implementation of the Pipeline mode for every configuration of channel 500, when processing several configurations in one channel 500. To process each configuration, the package needs to be sent to channel 500.

If Load and Save steps are required, multi-channel data manager 205 gives control to the DMA channel reload 207. DMA channel reload 207 performs the Load/Save steps and reports this to multi-channel data manager 205.

If one embodiment, multi-channel data manager 205 and DMA channel reload 207 can be combined into one module and transmit one output to BUS 108.

The use of CPU 107 for steps Config and Control in the modes CPU fully controlled and first-try automatic guarantees the synchronicity of control for all channels 500.

In one embodiment, in the Automatic control mode, during processing packages current period of tick signal S106, CPU 107 writes to the memory 109 the configurations and controls for channels 500. Multi-channel data manager 205 reads the configurations from memory 109 and sends them to channels 500 when processing packages of the next period of tick signal S106. This control ensures synchronous control of all channels 500.

In Automatic control mode, if needed to stop operation of multi-channel data manager 205 after/before the Config and/or Control steps, CPU 107 sends a command to multi-channel data manager 205. Multi-channel data manager 205 stops operation and generates interrupt signal S206. Multi-channel data manager 205 will continue processing on a command from CPU 107. The stop of multi-channel data manager 205 set by CPU 107 can be single or cyclic.

In FIG. 7A, steps having shaded backgrounds are not active (i.e., not used). In one embodiment, the time of package generating is equal to the period of tick signal S106.

In one embodiment, channel 500(1), in its Config 1 configuration, processes signal S501 (*i*). In the Config 1 configuration, data packages are processed in the same way as they are in operation of channel 500 in the typical GNSS receiver (shown in FIG. 1) in a pipeline mode.

In Config 1, the Load and Save steps are not used. Config 1 is carried out in the following manner. At Tick 1, the configuration is set and the GNSS signal is processed. If needed, ready data is read. At Tick 2 and Tick 3, the GNSS signal processing continues and, if necessary, ready data is read and/or written using control commands.

In one embodiment, channel 500(2) processes signal S501(*i*+1) in the configuration Config 2 and the configuration Config 3.

Config 2 is carried out in the following manner. At Tick 1, the configuration is set, the GNSS signal is processed and save current state Config 2 channel 500(2), and, if needed, ready data is read. At Tick 2 and Tick 3, GNSS signal processing continues, load/save current state Config 2 channel 500(2), and, if needed, ready data is read and wrote control commands.

Config 3 is carried out in the following manner. Tick 1 is not used. At Tick 2, the configuration is set, the GNSS signal is processed, save current state Config 3 channel 500(2), and, if needed, ready data is read. At Tick 3, GNSS signal processing continues, load/save current state Config 3 channel 500(2) and, if needed, ready data is read and wrote control commands.

In another embodiment, channel 500(3) processes signal S501(*i*+2) into the configuration Config 4 and the configuration Config 5.

Config 4 and Config 5 are carried out in the following manner. At Tick 1, the configuration is set, the GNSS signal is processed and save current state Config 4/Config 5 channel 500(3), and, if needed, ready data is read. At Tick 2 and Tick 3, GNSS signal processing continues, load/save current state Config 4/Config 5 channel 500(3) and, if needed, ready data is read and wrote control commands.

During forming of a new package after tick signal S106 9200, the following packages are simultaneously processed: channel 500(1) in Config 1 is processing S501(*i*), channel 500(2) in Config 2 is processing S501(*i*+1), channel 500(3) in Config 4 is processing S501(*i*+2). Then, the packages again processed: channel 500(2) in Config 3 is processing S501(*i*+1), and channel 500(3) in Config 5 is processing S501(*i*+2).

In FIG. 7A the steps are carried out in the following sequence.

Once tick signal S106 number 1—Tick 1 9100 has occurred, the following steps are performed: Config step 9111 sets Config 1, Config step 9121 sets Config 2, Config step 9141 sets Config 4, Processing steps 9114, 9124, and 9144, Save steps 9125 and 9145, Read steps 9116, 9126, and 9146, Config 9151 sets Config 5, Processing step 9154, Save step 9155, and Read step 9156.

Once signal tick S106 number 2—Tick 2 9200 has occurred, the following steps are performed: Load steps 9222 and 9242, Control step 9213 for Config 1, Control step 9223 for Config 2, Control step 9243 for Config 4, Processing steps 9214, 9224, and 9244, Save steps 9225 and 9245, Read steps 9216, 9226, and 9246, Config step 9231 sets Config 3, Load step 9252, Control step 9253 for Config 5, Processing steps 9234 and 9254, Save steps 9235 and 9255, Read step 9236, and Read step 9256.

Once signal tick S106 number 3—Tick 3 9300 has occurred, the following steps are performed: Load steps 9322 and 9342, Control step 9313 for Config 1, Control step 9323 for Config 2, Control step 9343 for Config 4, Processing steps 9314, 9324, and 9344, Save steps 9325 and 9345, Read step 9316, Read step 9326, Read step 9346, Load steps 9332 and 9352, Control step 9333 for Config 3, Control step 9353 for Config 5, Processing steps 9334 and 9354, Save steps 9335 and 9355, and Read steps 9336 and 9356. It should be noted that processing steps 9114, 9124, and 9144 are carried out at the same time; processing steps 9214, 9224, and 9244 are carried out at the same time; processing steps 9234 and 9254 are carried out at the same time; processing steps 9314, 9324, and 9344 are carried out at the same time; and processing 9334 and 9354 are carried out at the same time.

During the period of tick signal S106 (i.e., the time of the formation of a new package), in order to process the configurations "Config 2 . . . 5", it is necessary to send packages to channel 500 (2,3) two times.

In one embodiment, in single GNSS signal processing mode, channel 500 operates in the configuration which corresponds to Config 1.

In one embodiment, in multi-configuration mode of GNSS signal processing, channel 500 is used in some configurations, which corresponds to Config 2 . . . 5, the configurations can be added or deleted from processing, and only necessary configurations are in operation.

In one embodiment, using multi-channel data manager 205, a plurality of channels 500 can be run at the same time in the Single GNSS signal processing mode and the Multi-configuration mode of GNSS signal processing.

Figure 7B:
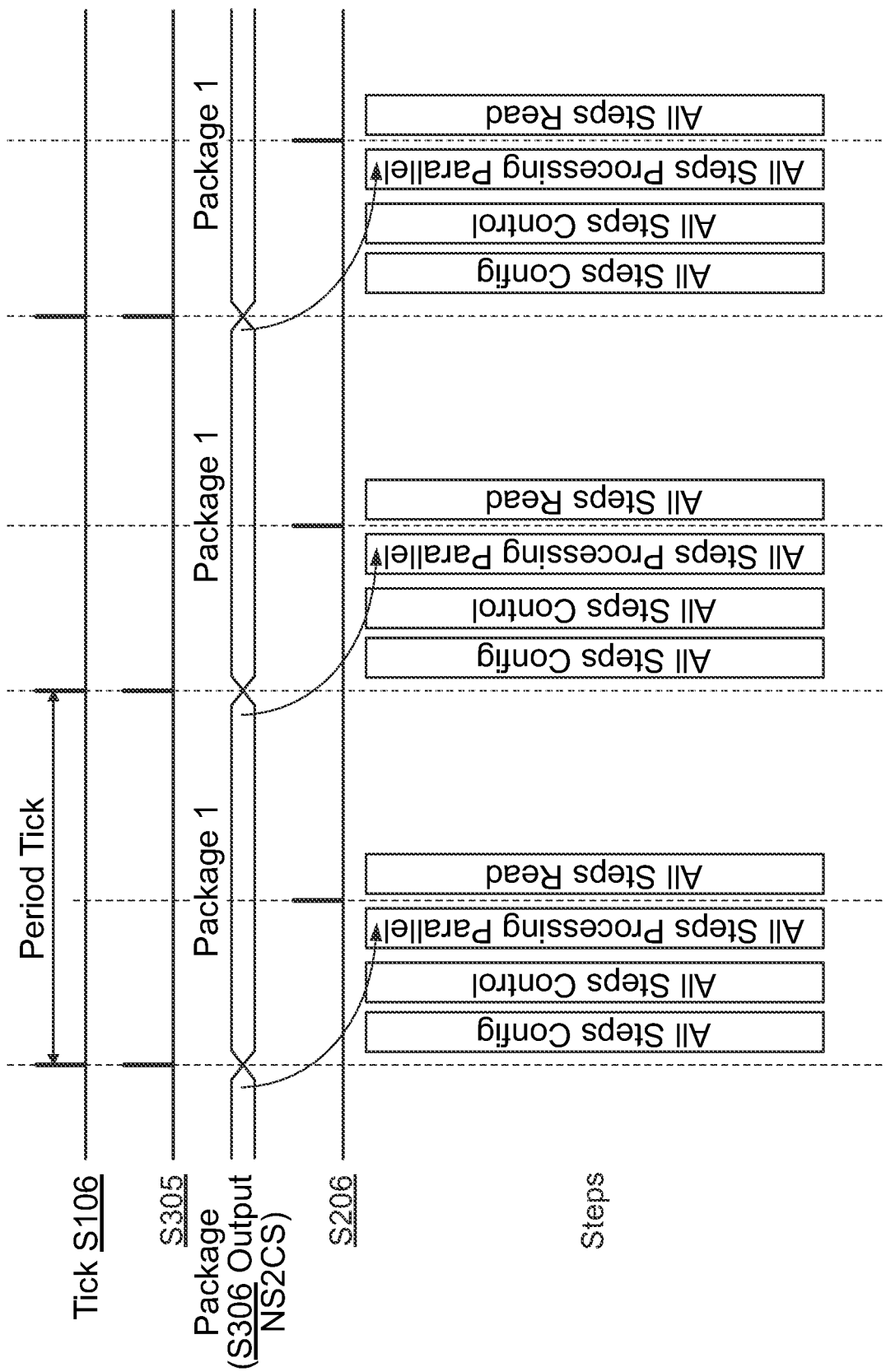
FIG. 7B shows a diagram of multi-channel data manager of FIGS. 2, 3, 5, and 6 operating in a CPU fully controlled mode of operation according to one embodiment.

FIG. 7B shows a diagram of multi-channel data manager 205 operation in CPU Full controlled mode according to an embodiment.

A package corresponds to the period of tick signal S106. In CPU Full controlled mode, CPU 107 uses tick signal S106, S305 and signal S206 and fully controls GNSS signal processing using multi-channel data manager 205 controlling Config, Control, and Read steps.

In Single GNSS signal processing mode according to one embodiment, channel 500 uses only one configuration. NS2CS interface block 202 starts to form package based on tick signal S106. CPU 107 receives signal S305 and executes Config and Control steps. In Processing step, multi-channel data manager 205 transmits package to navigation channels 104 by command CPU 107. Multi-channel data manager 205 finishes transmitting package and generates signal S206. CPU 107 receives signal S206 and executes Read Step. Then all the steps are repeated cyclically.

Figure 7C:
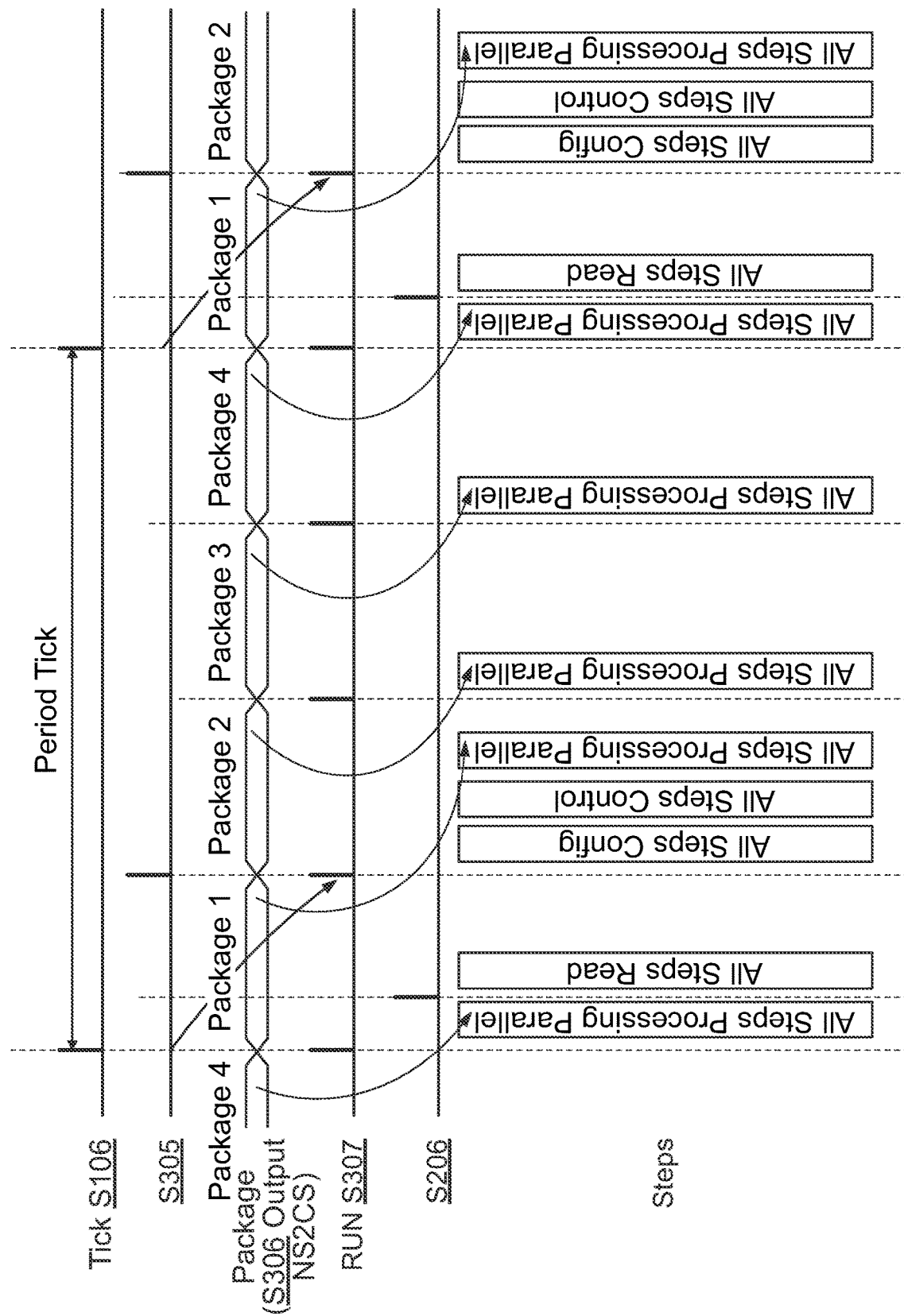
FIG. 7C shows a diagram of multi-channel data manager of FIGS. 2, 3, 5, and 6 operating in a the First-try automatic mode of operation according to one embodiment.

FIG. 7C shows a diagram of multi-channel data manager 205 operation in First-try automatic mode (4 packages are formed per tick) according to an embodiment.

Over the period of tick signal S106, four packages are formed (i.e., multi packages mode). In First-try automatic mode, processing of package 2 and package 3 does not require any control from CPU 107. After processing package 4, CPU 107 receives signal S206 and reads ready data from channels 500.

In Single GNSS signal processing mode according to one embodiment, channel 500 uses only one configuration. NS2CS 202 starts to form a package based on tick signal S106. CPU 107 receives signal S305 and executes Config and Control steps. In Processing step, multi-channel data manager 205 transmits package 1 to Navigation channels 104 by command CPU 107. In Processing steps, multi-channel data manager 205 transmits package 2, package 3 and package 4 to navigation channels 104 by signal S307. 205 finishes by transmitting package 4 and generates signal S206. CPU 107 receives signal S206 and executes Read step. Then all the steps are repeated cyclically.

Figure 7D:
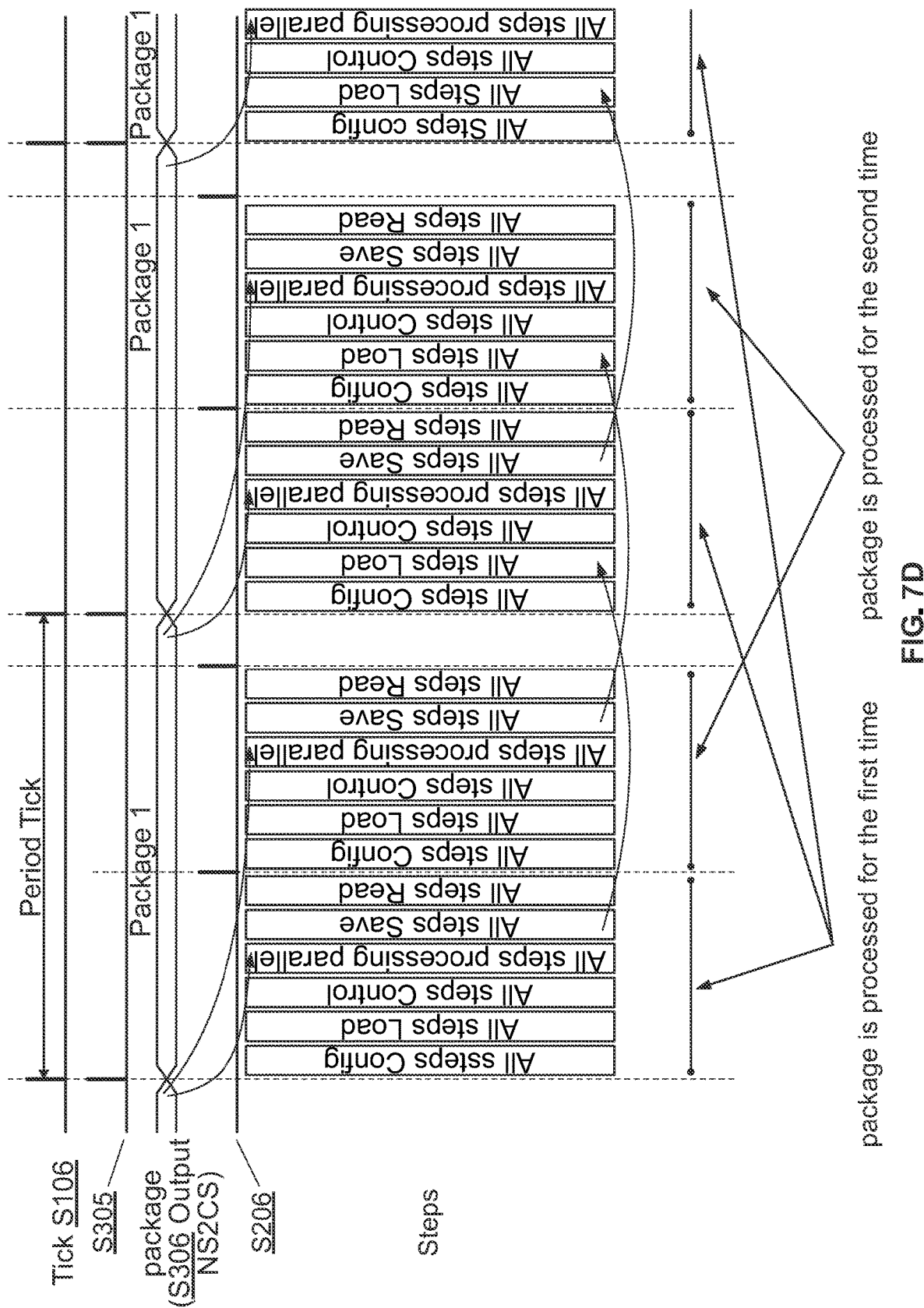
FIG. 7D shows a diagram of multi-channel data manager of FIGS. 2, 3, 5, and 6 operating NS2CS interface block in a single package mode and multi-channel data manager in Automatic control mode of operation according to one embodiment.

FIG. 7D shows a diagram of multi-channel data manager 205 and DMA channel reload 207 operation in Automatic control mode and NS2CS in single package mode according to an embodiment.

A package corresponds to the period of tick signal S106 (single package mode). During the formation of a new package, the current package is sent to the channel 500 twice, to process GNSS signals in two configurations using one channel 500. NS2CS interface block 202 starts to form package based on tick signal S106. CPU 107 write to memory 109 control commands for channel 500. Next steps are repeated twice in two configurations. Multi-channel data manager 205 receives signal S305 and executes Config, Load, and Control Steps reads data from memory 109. In Processing Step, multi-channel data manager 205 transmits package to navigation channels 104. Multi-channel data manager 205 finishes transmitting package, executes Save Step (read current state from channel 500 and write to memory 109), executes Read Step (read ready data from channel 500 and write to memory 109) and generates signal S206. CPU 107 receives signal S206 and read ready data from memory 109. Then multi-channel data manager 205 wait signal S305. Then all the steps are repeated cyclically.

Figure 7E:
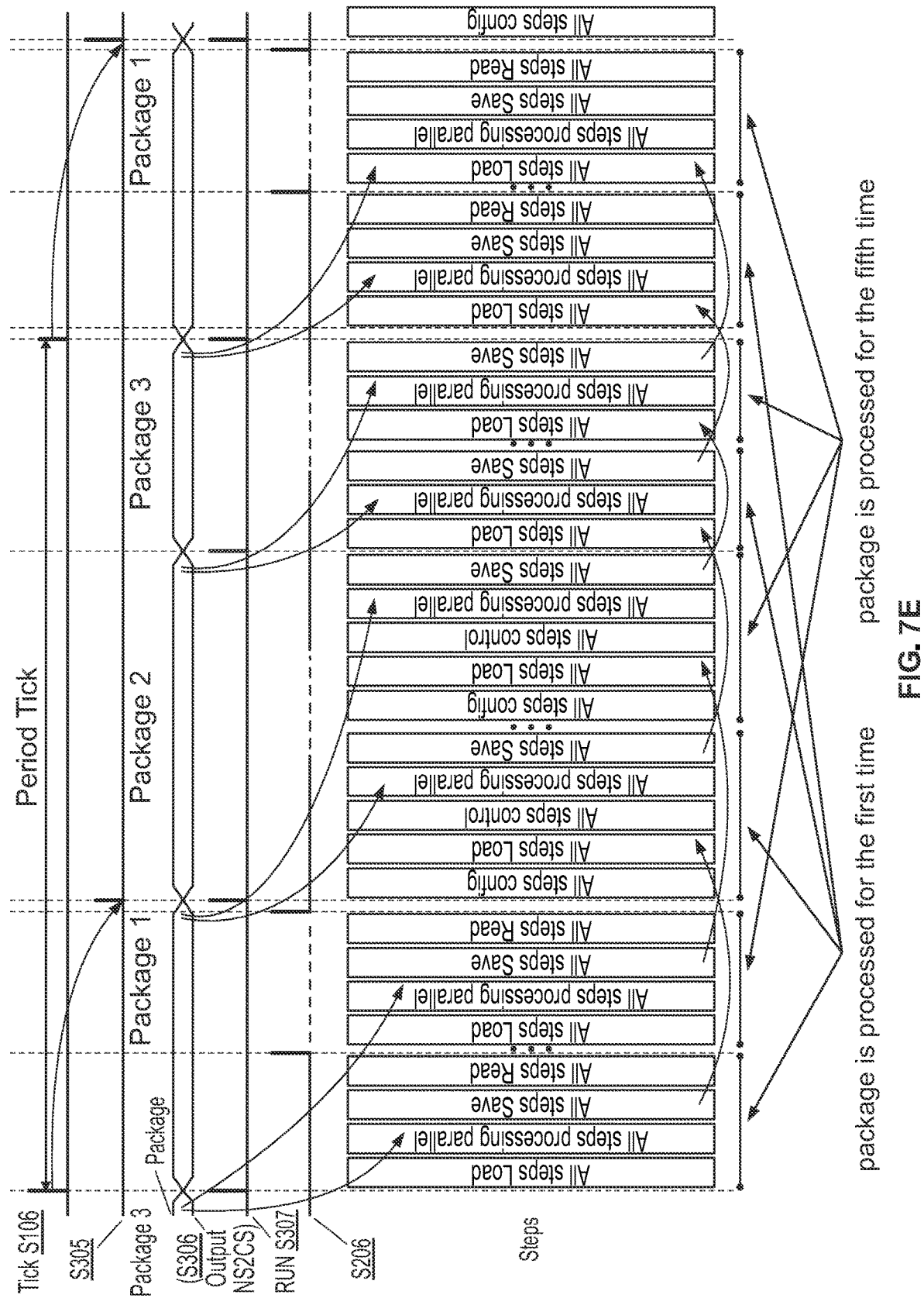
FIG. 7E shows a diagram of multi-channel data manager of FIGS. 2, 3, 5, and 6 operating NS2CS interface block in a multi packages mode and multi-channel data manager in Automatic control mode of operation according to one embodiment.

FIG. 7E shows a diagram of multi-channel data manager 205 and DMA channel reload 207 operations in Automatic control mode and NS2CS in multi-package mode (3 packages are formed per tick) according to an embodiment.

Over the period of tick signal S106, 3 packages are formed (multi-package mode). During the formation of a new package, the current package is sent to the channel 500 5 times to process GNSS signals in 5 configurations in one channel 500. NS2CS interface block 202 starts to form package based on tick signal S106. CPU 107 writes to memory 109 control commands for channel 500. Multi-channel data manager 205 receives signal S305 and starts processing package 1. Next steps are repeated 5 times in 5 configurations. Multi-channel data manager 205 executes Config, Load and Control Steps reads data from memory 109. In Processing step, multi-channel data manager 205 transmits package to navigation channels 104. Multi-channel data manager 205 finishes transmitting package, executes Save step (read current state from channel 500 and write to memory 109). Multi-channel data manager 205 receives signal S307 and starts processing package 2. Next steps are repeated 5 times in 5 configurations. In Load step, multi-channel data manager 205 read current state from memory 109 and writes to channel 500. In Processing step, multi-channel data manager 205 transmits package to navigation channels 104. Multi-channel data manager 205 finishes transmitting package, executes Save step (reads current state from channel 500 and writes to memory 109). Multi-channel data manager 205 receives signal S307 and starts processed package 3. Next steps are repeated 5 times in 5 configurations. In Load Step, multi-channel data manager 205 read current state from memory 109 and writes to channel 500. In Processing step, multi-channel data manager 205 transmits package to navigation channels 104. Multi-channel data manager 205 finishes transmitting package, executes Save Step (reads current state from channel 500 and writes to memory 109). Then executes step Read, multi-channel data manager 205 reads ready data from channel 500 and writes to memory 109 and generates signal S206. CPU 107 receives signal S206 and reads ready data from memory 109. Then multi-channel data manager 205 waits signal S305. Then all the steps are repeated cyclically.

In one embodiment, the architecture of the GNSS receiver includes navigation system 200 which processes GNSS signals in a pipeline mode based on clock CLKnav and generates packages using NS2CS interface blocks 202, providing a greater flexibility in processing GNSS signals. In one embodiment, the formation of packages is tied to tick signal S106 and packages are further processed in CPU system 210 based on clock CLKcpu.

In one embodiment, data from a plurality of re-quantizers 103 are combined in one package over a time period with the same number of samples is used one NS2CS interface block 202, and a package is formed that is placed in memory 109. This package is input to navigation channels 104 using multi-channel data manager 205 where it is processed based on CLKcpu. This NS2CS interface block 202 generates packages one after the other allowing the pipeline to process the GNSS signal in the navigation channels 104. Controlling and data reading from navigation channels 104 is executed between package processing.

In one embodiment, when using the decimator (e.g., signal processor 103, decimator NS2CS 301), the package is formed by a separate NS2CS interface block 202. Each NS2CS interface block 202 forms its own package and puts it in memory 109. After package formation, multi-channel data manager 205 retrieves the packages from memory 109 and simultaneously sends them to navigations channel 104.

In one embodiment, the main feature is adding unit DMA reload channel 207. DMA reload channel 207 allows GNSS signals to be processed in several current configurations with the help of channel 500 during the time of forming a new package. In one embodiment, DMA reload channel 207 provides pipeline processing of several current configurations with channel 500.

Packages in Navigation channels 104 can be processed in different modes: CPU fully controlled mode where CPU 107 controls all GNSS signal processing; First-try automatic mode where CPU 107 controls multi-channel data manager 205 and channels 500. Multi-channel data manager 205 sends packages in channels 500 using signals S307 and by command from CPU 107; and Automatic control mode where CPU 107 controls channels 500 via memory 109, and multi-channel data manager 205 reads control from memory 109 and itself generates packages. In this mode, DMA channel reload 207 used for processing package in several current configurations. Before operation, and if needed during operation, CPU 107 controls multi-channel data manager 205.

The use of DMA Reload channel 207 allows reduction of the number of channels 500 while ensuring the same quality of GNSS signal processing, or conversely, not changing the number of channels gains the functional benefits of reusing channels with several configuration.

In a standard GNSS receiver, channel 500 processes the GNSS signal in one configuration. In the present disclosure, channel 500 processes GNSS signals in several configurations, which are the same as increasing the number of channel 500. Using a greater number of configurations will improve the operational quality of the GNSS receiver.

In one embodiment, a computer is used to perform the operations of the components and equations described herein and shown, for example, in FIGS. 2, 3, 5 and 6. The components may be, for example, ADCs, signal processors, re-quantizers, etc. A high-level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.), and loaded into memory 1010 when execution of the computer program instructions is desired. Thus, method steps described herein can be defined by the computer program instructions stored in the memory 1010 and/or storage 1012 and controlled by the processor 1004 executing the computer program instructions. For example, the computer program instructions can be implemented as computer executable code programmed by one skilled in the art to perform an algorithm defined by one of the various methods described herein. Accordingly, by executing the computer program instructions, the processor 1004 executes an algorithm defined by the method steps described herein. The computer 1002 also includes one or more network interfaces 1006 for communicating with other devices via a network.

Figure 8:
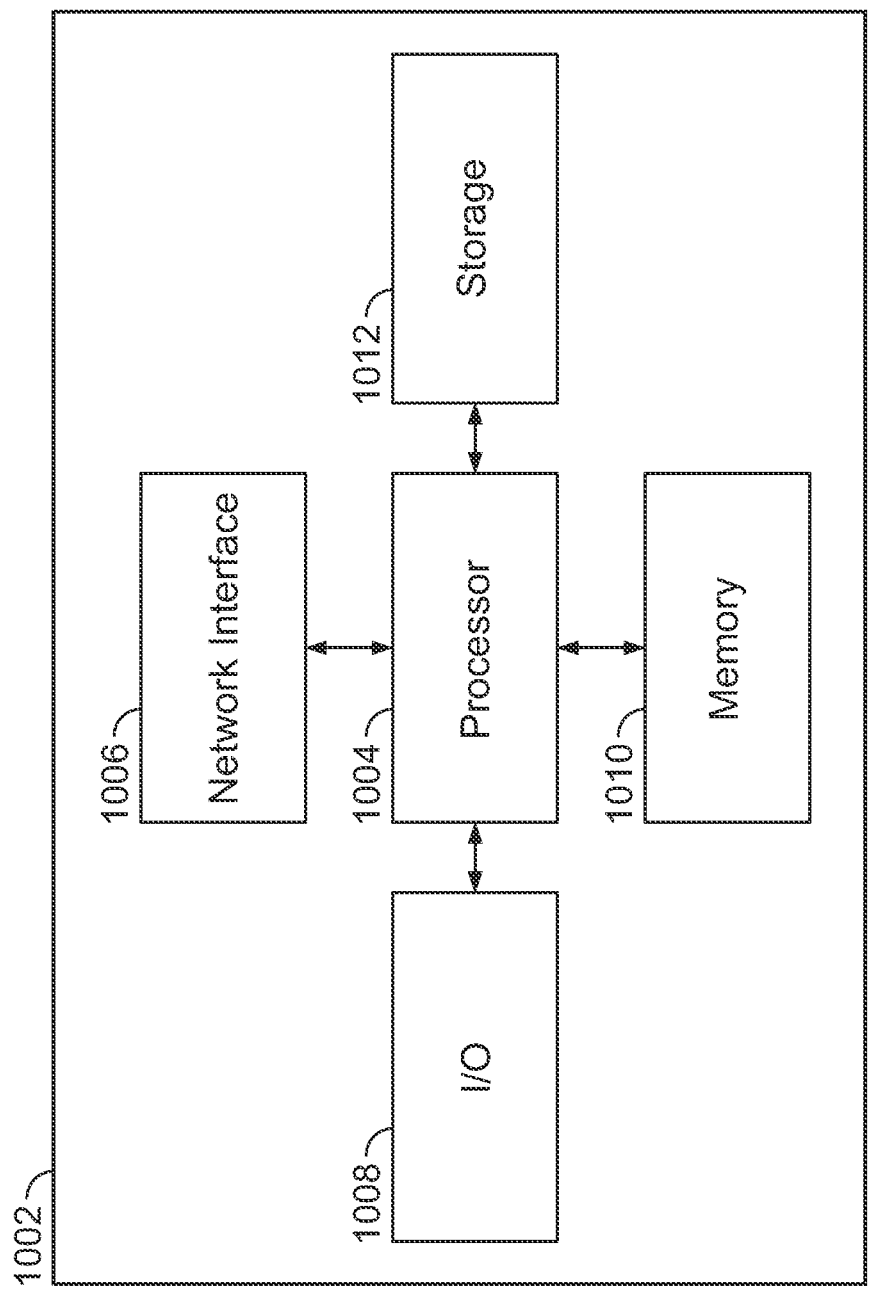
FIG. 8 shows a high-level block diagram of a computer for performing operations of the components described herein according to an embodiment.

The computer 1002 also includes input/output devices 1008 that enable user interaction with the computer 1002 (e.g., display, keyboard, mouse, speakers, buttons, etc.) One skilled in the art will recognize that an implementation of an actual computer could contain other components as well, and that FIG. 8 is a high-level representation of some of the components of such a computer for illustrative purposes.

The foregoing Detailed Description is to be understood as being in every respect illustrative and exemplary, but not restrictive, and the scope of the inventive concept disclosed herein should be interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A navigation receiver comprising:
a plurality of RF paths configured to receive and transmit Global Navigation Satellite System (GNSS) signals;
a navigation system configured to process the GNSS signals works on clock CLKnav and comprising:
a plurality of analog to digital convertors (ADCs) each configured to receive a GNSS signal from a respective one of the plurality of RF paths and generate a digitized signal;
a plurality of signal processors configured to process the digitized signals;
a plurality of re-quantizers configured to convert the processed digitized signals into low-bit data;
a plurality of Navigation system to CPU System (NS2CS) interface blocks configured to generate packages based on the low-bit data;
a MUX interconnect configured to distribute data streams; and
a time control unit configured to generate a tick signal is a time scale;
a CPU system operating based on the tick signal, the CPU system works CLKcpu and comprising:
a memory configured to store data and the packages;
a multi-channel data manager configured to convert packages into data;
a plurality of channels configured to receive and process data from the multi-channel data manager; and
a channel generate Integration Period signals indicating that the data is ready;
a DMA channel reload configured to control current states of each of the plurality of channels which work various configurations, the multi-channel data manager further configured to control the DMA channel reload; and
a CPU configured to control the navigation system and the CPU system and configured to process data received from the navigation system and the CPU system, CPU uses the tick signal and interrupt signals are used to synchronize control between the signal processors, the re-quantizer, the interface blocks NS2CS, the multi-channel data manager and the plurality of the channels.

2. The navigation receiver of claim 1, wherein the NS2CS interface block after writes last package for period of the tick signal into the memory and generates an interrupt signal to the CPU and multi-channel data manager.

3. The navigation receiver of claim 1, wherein the NS2CS interface blocks writes a package into memory and generates a RUN signal.

4. The device of claim 1, wherein the NS2CS interface block receives low-bit data from a number of Re-Quantizers have the same number of samples for one time period and converts the low-bit data to a package of a pre-set size.

5. The navigation receiver of claim 1, wherein NS2CS interface block starts to send data based on a tick signal generates one package over period of the tick signal or some packages over the period of the tick signal.

6. The navigation receiver of claim 1, wherein the multi-channel data manager reads from the memory all packages formed over one time period and converts packages into data and sends them to the plurality of channels at the same time.

7. The navigation receiver of claim 1, wherein after processing the last package in the current tick signal period, multi-channel data manager generates an interrupt for the CPU, CPU processes an interrupt signal from the multi-channel data manager.

8. The navigation receiver of claim 1, wherein the multi-channel data manager reads packages from the memory based on various combinations the RUN signals, interrupts from the NS2CS interface blocks, a command from the CPU.

9. The navigation receiver of claim 1, wherein the multi-channel data manager converts packages into data, sends it to the plurality of channels several times during the formation of the next package.

10. The navigation receiver of claim 1, wherein the DMA channel reload reads the current state of the plurality of channels from memory and loads the states into the channel before processing the data.

11. The navigation receiver of claim 1, wherein the DMA channel reload reads the current state of the plurality of channels and stores it in the memory after data processing.

12. The navigation receiver of claim 1, wherein one of the plurality of channels, using a commutator, if the selected enabling signal for the one of the plurality of channels is available, processes the selected data from the multi-channel data manager.

13. The navigation receiver of claim 1, wherein the CPU reads ready data after data processing in the plurality of channels and processes it.

14. The navigation receiver of claim 1, wherein the CPU sends a control the plurality of channels and sets the configuration of channels to the plurality of channels between data processing.

15. The navigation receiver of claim 1, wherein the CPU sends control the plurality of channels and sets the configuration of channel to the plurality of channels via the memory.

16. The navigation receiver of claim 15, wherein the multi-channel data manager reads from the memory a control the plurality of channels and the configuration of channels to the plurality of channels, and writes them into channels before data processing.

17. The navigation receiver of claim 15, wherein after data processing, the multi-channel data manager reads ready data from channel and writes it into memory generates an interrupt for the CPU, CPU processes an interrupt signal from multi-channel data manager.

18. The navigation receiver of claim 1, wherein on commands from the CPU, multi-channel data manager stops operation between data processing and generates an interrupt for CPU, and resumes data processing, and CPU processes an interrupt signal from multi-channel data manager.

19. The navigation receiver of claim 1, wherein one channel processing package using several configurations.

* * * * *